United States Patent
Shankar et al.

(10) Patent No.: US 12,081,430 B2
(45) Date of Patent: Sep. 3, 2024

(54) MARKING SPOKE LINKS FOR NETWORK SEGREGATION AND SERVICE CHAINING IN HUB AND SPOKE OVERLAY NETWORKS

(71) Applicant: Cisco Technology, Inc., San Jose, CA (US)

(72) Inventors: Hari Shankar, San Jose, CA (US); Eui Sun Ahn, Burnaby (CA); Jeffery Rodd Daviss, Port Coquitlam (CA); Rashmi Garg, Pleasanton, CA (US); Jon Langemak, Rockford, MN (US); William Mark Townsley, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 17/860,957

(22) Filed: Jul. 8, 2022

(65) Prior Publication Data
US 2024/0015091 A1 Jan. 11, 2024

(51) Int. Cl.
*H04L 45/12* (2022.01)
*H04L 9/40* (2022.01)
(Continued)

(52) U.S. Cl.
CPC ........ *H04L 45/123* (2013.01); *H04L 12/4633* (2013.01); *H04L 45/02* (2013.01); *H04L 63/0236* (2013.01)

(58) Field of Classification Search
CPC ... H04L 45/123; H04L 12/4633; H04L 45/02; H04L 63/0236
See application file for complete search history.

(56) References Cited

U.S. PATENT DOCUMENTS 8,085,690 B1 * 12/2011 Leelanivas .............. H04L 45/00
370/255
2003/0135468 A1 * 7/2003 Barbir .................. G06Q 20/382
705/64

(Continued)

OTHER PUBLICATIONS

Anonymous, "Service Chain Route Reorigination", Juniper Networks, XP093085407, URL:https://www.juniper.net/documentation/en_US/contrail2.21/topics/task/configuration/service-chain-route-reorig-vnc.html _[retrieved on Sep. 25, 2023] the whole document, Jun. 10, 2016, pp. 1-pp. 16.

(Continued)

*Primary Examiner* — Chris Parry
*Assistant Examiner* — Dixon F Dabipi
(74) *Attorney, Agent, or Firm* — Lee & Hayes, P.C.

(57) ABSTRACT

Techniques for a hub node to, provisioned in a network site of a hub and spoke overlay network, to receive a network advertisement from the spoke, decode network routing requirements from a border gateway protocol (BGP) large community associated with the network advertisement, and store the network routing requirements in association with a route associated with the spoke. The routing requirements may indicate one or more service(s) to be applied to the packet, a trust level associated with the spoke, and/or a trust zone associated with the spoke. The hub node may receive a packet from the spoke to be transmitted to destination spoke. The hub node may then route the packet to the destination spoke, drop the packet, or send the packet to a service node configured to apply the one or more services to the packet based on the routing requirements.

20 Claims, 11 Drawing Sheets

(51) Int. Cl.
    *H04L 12/46*     (2006.01)
    *H04L 45/02*     (2022.01)

(56) References Cited

U.S. PATENT DOCUMENTS

| | | |
|---|---|---|
| 2006/0002401 A1 | 1/2006 | Mukherjee et al. |
| 2006/0215672 A1 | 9/2006 | Lawrence et al. |
| 2011/0013641 A1* | 1/2011 | Kolhi ................ H04L 61/2535 380/279 |
| 2013/0019317 A1* | 1/2013 | Whelan ................ H04L 9/3297 726/26 |
| 2018/0013584 A1* | 1/2018 | Shen ........................ H04L 45/00 |
| 2019/0320047 A1* | 10/2019 | Jeuk ........................ H04L 69/22 |
| 2021/0306261 A1 | 9/2021 | Duan et al. |

OTHER PUBLICATIONS

PCT Search Report and Written Opinion mailed Oct. 4, 2023 for PCT application No. PCT/US23/27108, 12 pages.
Snijders, et al., "Use of BGP Large Communities", RFC8195.txt, Internet Engineering Task Force, IETF; Standard, Internet Society (ISOC) 4, Rue Des Falaises Ch—1205 Geneva, Switzerland, Jul. 1, 2017 (Jul. 1, 2017), pp. 1-15.

\* cited by examiner

US 12,081,430 B2

MARKING SPOKE LINKS FOR NETWORK SEGREGATION AND SERVICE CHAINING IN HUB AND SPOKE OVERLAY NETWORKS

TECHNICAL FIELD

The present disclosure relates generally to embedding routing requirements into metadata associated with spoke routes of a hub and spoke overlay network.

BACKGROUND

Service providers offer computing-based services, or solutions, to provide users with access to computing resources to fulfill users' computing resource needs without having to invent in and maintain computing infrastructure required to implement the services. These service providers often maintain networks of data centers which house servers, routers, and other devices that provide computing resources to users such as compute resources, networking resources, storage resources, database resources, application resources, security resources, and so forth. The solutions offered by service providers may include a wide range of services that may be fine-tuned to meet a user's needs. Additionally, in cloud-native environments, such as, a hub and spoke network, for example, difficulties in the transmission of data from one endpoint to another may occur when the endpoints reside in spoke networks having different configurations. While there may be mechanisms to transmit data between two spoke networks, there is a need to regulate these data transmissions based on the individual configurations of the networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
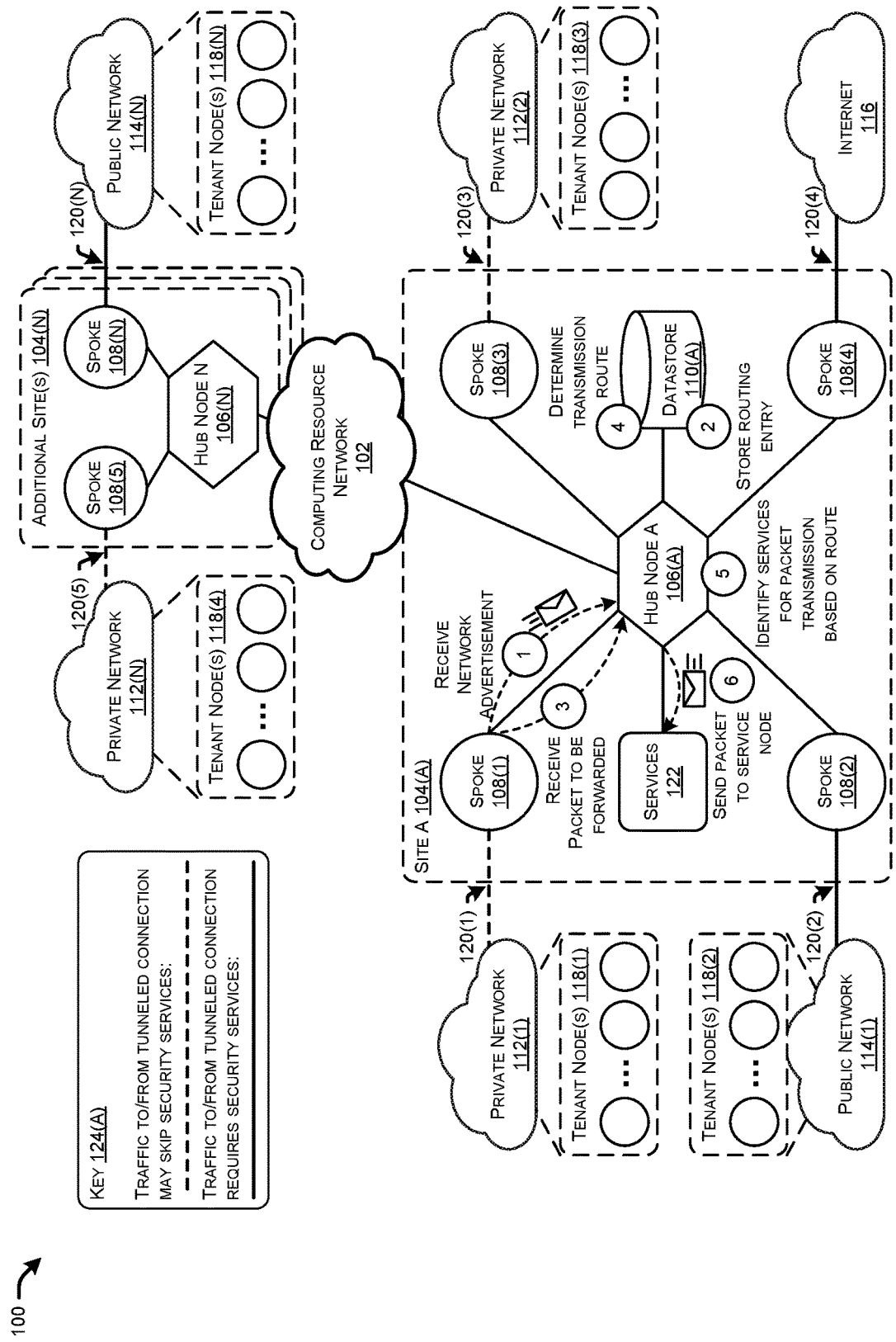
FIG. 1A illustrates a system architecture diagram of an example flow for a multi-site computing resource network (e.g., a hub and spoke overlay network) including a hub node in a first site to receive a packet from a source spoke to be transmitted to a destination spoke, determine a transmission route from the source spoke to the destination spoke, and identify one or more services to apply to the network traffic based on the transmission route.

This disclosure describes method(s) for using virtual network instance (VNI) labels (e.g., a multiprotocol label switching (MPLS) label, a virtual extensible local area network (VXLAN) label, a generic network virtualization encapsulation (GENEVE) label, etc.) in a hub and spoke overlay network to advertise network routing configurations, embed routing requirements as metadata associated with spoke routes, and route network data according to the routing requirements. The method includes receiving a network advertisement at a first hub node of a hub and spoke network. In some examples, the network advertisement may indicate a first tunneled connection connecting a first spoke network to the first hub node and/or a first border gateway protocol (BGP) large community string associated with the first tunneled connection. In some examples, the first BGP large community string may include at least a first portion encoded with an indication of a first virtual network instance (VNI) type of the first spoke network and/or a second portion encoded with an indication of a first routing requirement associated with the first spoke network. Additionally, or alternatively, the method includes storing, in a routing table associated with the first hub node, a first routing entry including a first address of the first tunneled connection and/or the first BGP large community string. Additionally, or alternatively, the method includes receiving, at the first hub node, a first data packet from the first spoke to be transmitted to a destination node. Additionally, or alternatively, the method includes determining a route to transmit the first data packet from the first spoke to the destination node based at least in part on the routing table. In some examples, the route may include the first tunneled connection and/or a second tunneled connection connecting a second spoke network of the hub and spoke network to a second hub node of the hub and spoke network. Additionally, or alternatively, the method includes identifying the first routing requirement and/or a second routing requirement associated with the second spoke network based at least in part on the first routing entry and/or a second routing entry including a second address of the second tunneled connection and/or a second BGP large community string. Additionally, or alternatively, the method includes sending the first data packet to the second hub node based at least in part on the first routing requirement and the second routing requirement. Additionally, or alternatively, the method includes sending the first data packet to a first service node of the hub and spoke network configured to apply one or more services to the first data packet associated with at least one of the first routing requirement or the second routing requirement based at least in part on the first routing requirement and the second routing requirement. Additionally, or alternatively, the method includes dropping the first data packet based at least in part on the first routing requirement and the second routing requirement.

Additionally, or alternatively, the method includes receiving a network advertisement at a first hub node of a hub and spoke network. In some examples, the network advertisement may indicate a connection of a first spoke to the first hub node and/or one or more routes associated with the first spoke. In some examples, a first route of the one or more routes may be associated with a first border gateway protocol (BGP) large community string. Additionally, or alternatively, the method includes storing, in a routing table associated with the first hub node, a first routing entry including the first route and the first BGP large community string. In some examples, the first BGP large community string may include at least a first portion encoded with a first indication of a first virtual network instance (VNI) type of the first spoke and/or a second portion encoded with a second indication of one or more services to be applied to network traffic associated the first route. Additionally, or alternatively, the method includes receiving, at the first hub node, network traffic from the first spoke to be transmitted to a destination node. Additionally, or alternatively, the method includes determining a transmission route to transmit the network traffic from the first spoke to the destination node based at least in part on the routing table, the transmission route including at least the first route. Additionally, or alternatively, the method includes identifying, based at least in part on first VNI type associated with the first routing entry, the one or more services to apply to the network traffic. Additionally, or alternatively, the method includes sending the network traffic to a first service node of the hub and spoke network configured to apply at least a first service of the one or more services to the network traffic associated with the first route.

Additionally, or alternatively, the method includes receiving a network advertisement at a first hub node of a hub and spoke network. In some examples, the network advertisement may indicate a first tunneled connection connecting a first spoke network to the first hub node and/or a first border gateway protocol (BGP) large community string associated with the first tunneled connection. In some examples, the first BGP large community string may include at least a first portion encoded with an indication of a first virtual network instance (VNI) type of the first spoke network and/or a second portion encoded with an indication of a first trust level associated with the first spoke network. Additionally, or alternatively, the method includes storing, in a first routing table associated with the first hub node, a first routing entry including the first tunneled connection and the first BGP large community string. Additionally, or alternatively, the method includes receiving, at the first hub node, a first data packet from a source node associated with the first spoke to be transmitted to a first destination node. Additionally, or alternatively, the method includes determining a first route to transmit the data packet from the first spoke network to the first destination node, the first route including a second tunneled connection connecting a second spoke network of the hub and spoke network to the first hub node. Additionally, or alternatively, the method includes identifying, in the first routing table and based at least in part on a second VNI type associated with the second spoke network, a second routing entry including the second tunneled connection and/or a second BGP large community string including at least a first portion encoded with an indication of the second VNI type and/or a second portion encoded with an indication of a second trust level associated with the second spoke network. Additionally, or alternatively, the method includes sending the first data packet to the first destination node using the second tunneled connection based at least in part on the first trust level and the second trust level. Additionally, or alternatively, the method includes dropping the first data packet based at least in part on the first trust level and the second trust level.

Additionally, the techniques described herein may be performed by a system and/or device having non-transitory computer-readable media storing computer-executable instructions that, when executed by one or more processors, performs the method described above.

Example Embodiments

Overlay networks (e.g., a hub and spoke network) may utilize traffic head ends (e.g., spokes) to connect various virtual networks allowing for a multi-tenant configuration. Network traffic may be routed between separate networks via the spokes and corresponding hub nodes provisioned in a site of the network. For example, spokes may be unaware of the network topology, hub nodes of a hub and spoke overlay network may have full routing topology knowledge to utilize and may be configured to directly communicate network traffic with other hub nodes while spokes may be configured to communicate with a particular hub node that is local to a particular spoke (e.g., a hub node in the same network site as a spoke) to facilitate the transmission of the network traffic. However, spokes may be connected to various types of network(s) (e.g., private networks, public networks, secure networks, unsecure networks, enterprise networks, the internet, etc.), each of which may require different routing operations to be performed on network traffic (e.g., the network traffic must meet routing requirements). For example, a secured network (e.g., a private network) may contain sensitive data that should not be accessible by an unsecured network (e.g., a public network). Additionally, a connection established in an unsecured network may need to access private and/or enterprise network resources subject to security services being applied to network traffic.

This disclosure describes techniques for a hub node, provisioned in a network site of a multi-site computing resource network, such as, for example, a hub and spoke overlay network, to receive, store, and/or forward network routing requirements associated with a spoke, and route network traffic to and/or from the spoke based on the routing requirements. In some examples, a hub node of a hub and spoke network, provisioned in a network site and configured to transmit network traffic associated with a spoke provisioned in the network site, may receive a packet from the spoke. In some examples, the packet may include an inner header including next hop information for a destination tenant node provisioned in a spoke network and/or an outer header including next hop information for a given spoke node of the hub and spoke overlay network. The hub node may be configured to decode network routing requirement(s) from a border gateway protocol (BGP) large community string associated with the packet and may store the network routing requirement(s) in a database associated with the hub node and in association with a corresponding spoke connecting a spoke network to a hub node. The routing requirement(s) may specify one or more services to be applied to inbound and/or outbound network traffic associated with the spoke. In some examples, the routing requirement(s) may specify a service chain including various services to be applied to the network traffic, such as, for example, a deep packet inspection (DPI) service, a cloud-delivered firewall (CDFW) service, a network address translation (NAT) service, a secure web gateway (SWG) service, a domain name service (DNS) layer security service, a cloud access security broker (CASB) service, and/or the like. Additionally, or alternatively, the network routing requirement(s) may specify a trust level and/or a trust zone associated with the spoke. In some examples, the trust level and/or trust zone may be configured to segregate network traffic between various spokes. For example, a first trust level of a first spoke may indicate whether network traffic may be sent to and/or received from a second spoke having a second trust level. Additionally, or alternatively, a first trust zone of a first spoke may indicate whether network traffic may be sent to and/or received from one or more second spokes having various trust levels and/or trust zones.

Additionally, or alternatively, the first hub node may be configured to further advertise network routing information to additional hub nodes in the hub and spoke network. For example, the first hub node may send the network routing information and/or the BGP large community string to a second hub node provisioned in a second site of the hub and spoke network, where the second hub node may decode and/or store the network routing requirements in association with the given route in a database associated with the second hub node. By advertising such routing requirements indicated by the BGP large community strings with other hub nodes in the network, each hub node may be aware of the network routing information associated with remote spokes provisioned in remote sites, thus allowing for implementation of the network routing requirements when sending network traffic between remote sites of the network.

The network routing information may be received as a network advertisement. In some examples, the network advertisement may be configured as a data packet, an advertisement packet, and/or an application programming interface (API) call, such as, for example, a representational state transfer (REST) API call including details for configuring a given spoke network with the computing resource network. In some examples, the network advertisement may comprise a border gateway protocol (BGP) large community string associated with a tunneled connection connecting a given spoke to a given hub node. The BGP large community string may comprise various portions encoded with the information, such as, for example, a first 4-byte portion encoded with a virtual network instance (VNI) type associated with a tenant node provisioned in a spoke network and/or a routing requirement associated with the spoke and/or the tenant node, a second 4-byte portion encoded with an indication of a VNI type associated with a spoke network, and/or a third 4-byte portion encoded with an address associated with a spoke (e.g., an Internet protocol (IP) address associated with a spoke network and/or a tunnel endpoint associated with the spoke network).

In some examples, the first 4-byte portion encoded with the VNI type associated with the tenant node and/or the routing requirement associated with the spoke and/or tenant node may be split into two segments. For example, the first 4-byte portion may include a first segment comprising 1-12 bits and/or a second segment comprising 20 bits. While a first 12-bit segment and a second 20-bit segment are described, the first 4-byte portion may include any number of segments any number of bits allowed by the 4-bytes. The second 20-bit segment may comprise a VNI label associated with a tenant node. In some examples, the VNI label may indicate a VNI type associated with the tenant node.

In some examples, the first 12-bit segment may comprise a BitVector representing one or more services to be performed on network traffic and/or a chain of services to be performed on network traffic associated with a given spoke. For example, each of the 12-bits included in the first segment may correspond to a particular service, where a "1" for a given bit may indicate that the corresponding service is to be applied (or performed) to the network traffic destined to and/or originating from a given spoke and a "0" for a given bit may indicate that the corresponding service is not to be applied to the network traffic destined to and/or originating from a given spoke.

Additionally, or alternatively, the first 12-bit segment may comprise a single bit indicating a trust level associated with a given spoke and/or 1-12 bits indicating a trust zone associated with a given spoke. For example, a first spoke may connect to a private network and a second spoke may connect to a public network. The first spoke may be associated with a first trust level (e.g., indicated by an integer, string of integers, or the like) and the second spoke may be associated with a second trust level. In some examples, the first trust level may be configured to allow network traffic to and/or from a spoke associated with the first trust level and disallow (e.g., cause packets to be dropped) network traffic to and/or from a spoke associated with a different trust level. Additionally, or alternatively, the first spoke may be associated with a first trust zone (e.g., one or more trust levels, a range of trust levels, and/or the like). In some examples, the first trust zone may be configured to allow network traffic to and/or from a spoke associated with the first trust level and/or a third trust level and disallow network traffic to and/or from a spoke associated with the second trust level.

In some examples, when a spoke and/or a tenant node provisioned in a spoke connects to a site of the hub and spoke network (e.g., comes online), the spoke may transmit network routing information associated with the spoke and/or the tenant node to a hub node provisioned in the same site of the hub and spoke network (e.g., the hub node local to the spoke). For example, one or more routing device(s) associated with a given spoke network may receive a VNI label for a given tenant node in the spoke network and may encode the first 4-byte portion of the BGP large community string with the VNI label and/or the routing requirement indication (e.g., a service chain BitVector, an indication of a trust level, and/or an indication of a trust zone). In some examples, a VNI label may be received from a hub node provisioned locally to a given spoke and/or from a database storing tenant VNIs. Additionally, or alternatively, the service chain BitVector may be received from a hub node provisioned locally to a given spoke, from a database storing service chain BitVectors, and/or configured by a network administrator associated with the given spoke. Additionally, or alternatively, the one or more trust level indicator(s) may be received from a hub node provisioned locally to a given spoke, from a database storing trust level indicator(s), and/or configured by a network administrator associated with the given spoke. The VNI label may be configured as a VNI label corresponding to the VNI type of the given spoke, such as, for example, MPLS, VXLAN, GENEVE, and/or any other network overlay protocol. The routing requirement may be configured as a service chain BitVector, an indication of a trust level, and/or an indication of a trust zone, as previously described. Additionally, or alternatively, the one or more routing device(s) may encode the second 4-byte portion of the BGP large community string with an indication of the VNI type of the given spoke, such as, for example, MPLS, VXLAN, GENEVE, and/or any other network overlay protocol. Additionally, or alternatively, the one or more routing device(s) may encode the third 4-byte portion of the BGP large community string with an IP version 4 (IPv4) address and/or an identifier of an IP version 6 (IPv6) address of the given spoke. In examples where the given spoke is associated with an IPv6 address, the IPv6 address may be mapped to a 4-byte identifier associated with a given spoke. In such examples, a given remote hub node may be configured to perform a lookup using the 4-byte identifier to determine the IPv6 address of the originating spoke based on the route the BGP large community string indicating that a given spoke is configured for IPv6 routing.

A hub node may be configured to decode network routing information from the various portions of the BGP large community string. In some examples, while decoding the network routing information, a hub node may be configured to assume that the IP address included in the third portion of the BGP large community string is an IPv4 address, unless an indication is otherwise provided. A hub node may be configured to determine such an indication by performing a lookup, based on a 4-byte identifier associated with a given remote hub node encoded in the third portion of the BGP large community string (in place of the IPv4 address) to determine the IPv6 address associated with given remote hub node.

Additionally, or alternatively, a hub node may be configured to store the network routing information associated with a given spoke and/or a given route as a mapping between the VNI label associated with the tenant node and/or the routing requirement, the indication of the VNI type of the given spoke, and/or the address associated with the hub node. By storing the network routing information in this way, a remote hub node may be configured to apply the network routing requirements associated with a remote spoke when routing traffic to a local spoke. For example, the remote hub node may identify, based on the mapping, the VNI label associated with a source node and/or a corresponding routing requirement (e.g., a service chain BitVector, a trust level, and/or a trust zone), the VNI type associated with a remote spoke, and the address associated with the remote spoke, and utilize the routing requirement to make a routing decision, such as, for example, dropping a packet, sending a packet to a service node to apply one or more services to the packet, and/or allowing a packet to be sent to a destination network.

As previously described, hub nodes associated with the hub and spoke network may be configured to advertise the network routing information received from a given spoke to each of the additional hub nodes in the hub and spoke network. By configuring each of the hub nodes to forward advertisements to each of the hub nodes in the hub and spoke network, each hub in the network may be configured to read and/or decode the BGP large community string of each route and learn a routing requirement of a given spoke, a VNI type of a given spoke, and/or IP address of a given hub node for the prefix of the route.

As described herein, a computing-based, cloud-based solution, hub node, and/or spoke network can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to using BGP large community string to encode network routing requirements for a given spoke and enforce routing requirements between spokes, increasing security and routing efficiency in a multi-site network with a multi-tenant overlay. For instance, the techniques described herein may allow for network routing requirements associated with a network connected by a given spoke to be sent to and applied by a hub node configured to route network traffic to and/or from the given spoke. By encoding network routing requirements specific to a given spoke and/or a route into a BGP large community string associated with a packet, a local hub node may decode the network routing requirements, store the network routing requirements locally, and forward the network routing requirements to remote hub nodes in the hub and spoke network, allowing for the remote hub nodes to read the BGP large community string of each route and learn the corresponding network requirements necessary to make routing decisions (e.g., applying one or more services to network traffic, dropping a packet based on unsatisfactory trust levels and/or trust zones, and/or allowing traffic from one network to another based on satisfactory trust levels and/or trust zones) for packets between different network types connected by separate spokes. For example, hub nodes in a hub and spoke overlay network may determine one or more services to apply to network traffic destined to and/or originating from a network connected by a given spoke. Additionally, hub nodes may compare trust levels and/or trust zones of a first network with trust levels and/or trust zones of a second network to determine whether the network traffic should be allowed or disallowed to and/or from the first network and/or the second network. As such, by determining a service chain to be applied to network traffic to and/or from a given spoke and/or determining whether network traffic should be allowed or disallowed to and/or from a given spoke, security of network traffic between separate networks in the hub and spoke network may be increased, flexibility of network configurations may be more robust, and/or computing resources may be preserved by dropping network traffic that is not configured for a given network type.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
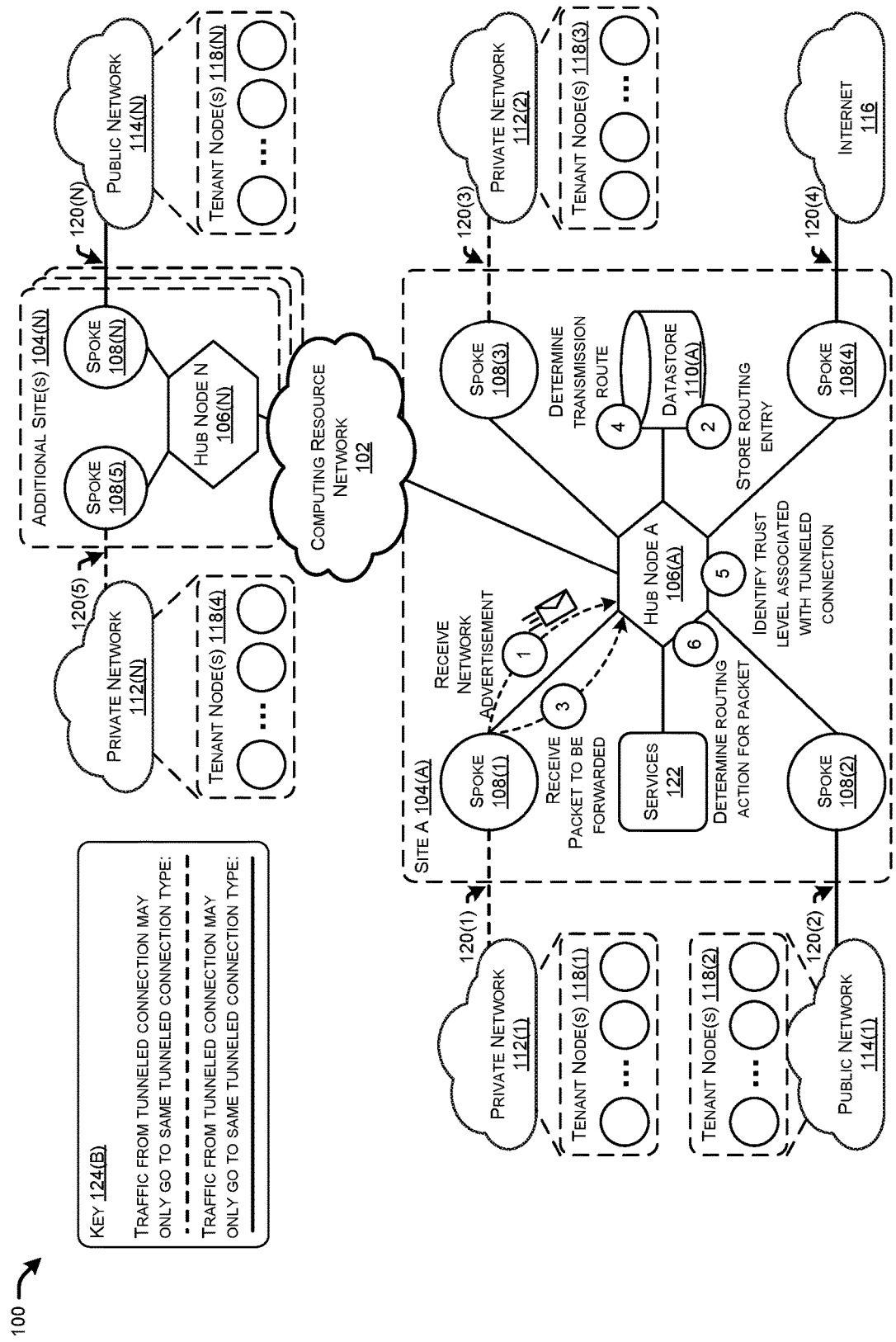
FIG. 1B illustrates a system architecture diagram of an example flow for a multi-site computing resource network including a hub node in a first site to receive a packet from a source spoke to be transmitted to a destination spoke, determine a transmission route from the source spoke to the destination spoke, and identify a trust level associated with a tunneled connection included in the transmission route.
Figure 1C:
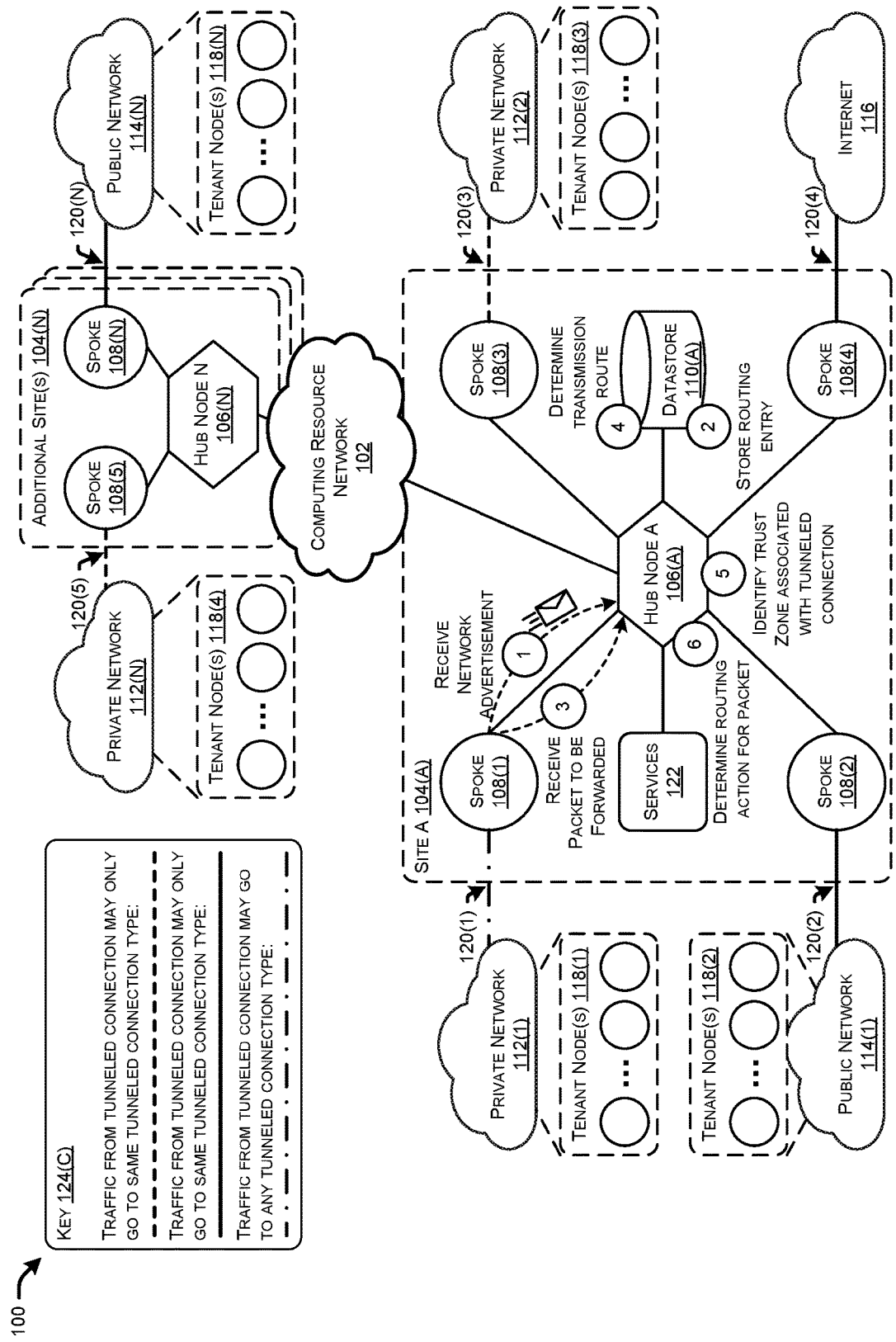
FIG. 1C illustrates a system architecture diagram of an example flow for a multi-site computing resource network including a hub node in a first site to receive a packet from a source spoke to be transmitted to a destination spoke, determine a transmission route from the source spoke to the destination spoke, and identify a trust zone associated with a tunneled connection included in the transmission route.

FIGS. 1A-1C illustrate a system architecture diagram 100 of example flow(s) for a multi-site computing resource network 102 including one or more network sites 104(A)-(N) including a respective hub node 106, respective spokes 108, and/or a respective datastore 110, where a hub node 106 may be configured to receive a packet from a local spoke 108, decode network routing information including one or more network routing requirement(s) associated with a spoke 108, and implement the network routing requirement(s) when routing a packet between separate spokes 108. Additionally, a given hub node 106 may be configured to send the network routing information, including network routing requirement(s) associated with a given spoke 108 that is provisioned locally to the given hub node 106, to remote hub nodes 106 in the network 102.

FIG. 1A illustrates an example system-architecture diagram 100 and an example flow for a computing resource network 102 (e.g., a hub and spoke overlay network) including at least a hub node 106(A) in a first site 104(A) to receive a packet from a source spoke 108(1) and to be transmitted to a destination spoke 108(2), determine a transmission route from the source spoke 108(1) to the destination spoke 108(2), and identify one or more services to apply to the network traffic based on the transmission route.

The computing resource network 102 may comprise one or more data centers that include various networking components, such as, a network controller and/or network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a hub node 106, one or more spoke(s) 108(1)-(N) connecting one or more private spoke network(s) 112(1)-(N), and/or one or more public spoke network(s) 114(1)-(N), and/or one or more internet access network(s) 116, and/or one or more tenant node(s) 118(1)-(N), where N may be any integer greater than 1.

Each of the spokes 108 of a given site 104 may provide a spoke network 112, 114, 116 access to a hub node 106 of the given site 104 via a tunneled connection 120. For example, a first hub node 106(A) provisioned in a first site 104(A) of the computing resource network 102 may be configured to route network traffic associated with a first spoke 108(1), a second spoke 108(2), a third spoke 108(3), and/or a fourth spoke 108(4) provisioned in the first site 104(A), such as, for example, network traffic originating from and/or destined to one or more tenant nodes 118(1), 118(2), 118(3) hosted in one or more spoke networks 112(1), 112(2), 114(1). Additionally, or alternatively, one or more second hub node(s) 106(N) provisioned in one or more second site(s) 104(N) of the computing resource network 102 may be configured to route network traffic associated with one or more fifth spoke(s) 108(5) and/or one or more sixth spoke(s) 108(N) provisioned in the one or more second site(s) 104(N), such as, for example, network traffic originating from and/or destined to one or more tenant nodes 118(4), 118(N) hosted in one or more spoke networks 112(N), 114(N). Additionally, or alternatively, the first hub node 106(A) and/or one or more second hub node(s) 106(N) may be communicatively coupled, such that they are configured to send network traffic to a given hub node 106 configured to route the network traffic to a destination spoke 110 provisioned in the same network site of the given hub node 106.

Additionally, or alternatively, each of the sites 104 may offer one or more services 122 implemented by way of a hub node 106 and/or a service node provisioned in a given site 104. In some examples, the one or more services 122 may comprise a deep packet inspection (DPI) service, a cloud-delivered firewall (CDFW) service, a network address translation (NAT) service, a secure web gateway (SWG) service, a domain name service (DNS) layer security service, and/or a cloud access security broker (CASB) service.

Take, for example, the computing resource network 102 configured as a hub and spoke overlay multiprotocol label switching (MPLS) network. As previously described, hub node A 106(A) may be provisioned in network site A 104(A) and configured to transmit network traffic associated with a first spoke 108(1), a second spoke 108(2), a third spoke 108(3), and/or a fourth spoke 108(4) provisioned in site A 104(A). For example, hub node A 106(A) may receive a packet from the first spoke 108(1). Hub node A 106(A) may be configured to decode network routing requirement(s) from a border gateway protocol (BGP) large community string associated with the packet and may store the network routing requirement(s) in a datastore 110(A) associated with the hub node and in association with the first spoke 108(1) connecting a first private network 112(1) to hub node A 106(A) via a tunneled connection 120(1). The routing requirement(s) may specify one or more services 122 to be applied to inbound and/or outbound network traffic associated with the first spoke 108(1) and/or the tunneled connection 120(1). As illustrated in FIG. 1A, the key 124(A) may represent tunneled connections 120 that require security services and/or tunneled connections 120 that may skip security services, which may be indicated by the routing requirements included in the datastore 110(A). In some examples, the routing requirement(s) may specify a service chain including various services 122 to be applied to the network traffic, such as, for example, a deep packet inspection (DPI) service, a cloud-delivered firewall (CDFW) service, a network address translation (NAT) service, a secure web gateway (SWG) service, a domain name service (DNS)

layer security service, a cloud access security broker (CASB) service, and/or the like.

Additionally, or alternatively, hub node A 106(A) may be configured to further advertise network routing information to additional hub nodes 106(N) in the hub and spoke network 102. For example, hub node A 106(A) may send the network routing information and/or the BGP large community string to hub node N 106(N) provisioned in site N 104(N) of the hub and spoke network 102, where hub node N 106(N) may decode and/or store the network routing requirements in association with the given route (or the tunneled connection 120) in a database associated with hub node N 106(N). By configuring hub nodes 106 to advertise such routing requirements indicated by the BGP large community strings with other hub nodes 106 in the network 102, each hub node 106 may be aware of the network routing information associated with remote spokes 108 provisioned in remote sites 104, thus allowing for implementation of the network routing requirements when sending network traffic between remote sites 104 of the network 102.

The network routing information may be received as a network advertisement. In some examples, the network advertisement may be configured as a data packet, an advertisement packet, and/or an application programming interface (API) call, such as, for example, a representational state transfer (REST) API call including details for configuring a given spoke network 112, 114, 116 with the computing resource network 102. In some examples, the network advertisement may comprise a border gateway protocol (BGP) large community string associated with a tunneled connection 120 connecting a given spoke 108 to a given hub node 106. The BGP large community string may comprise various portions encoded with the information, such as, for example, a first 4-byte portion encoded with a tenant VNI associated with a tenant node 118(1) provisioned in the private network 112(1) connected by a tunneled connection 120(1) to the first spoke 108(1) and/or a routing requirement associated with the first spoke 108(1) and/or the tunneled connection 120(1), a second 4-byte portion encoded with an indication of a virtual network instance (VNI) type associated with the private network 112(1) connected by the first spoke 108(1), and/or a third 4-byte portion encoded with an address associated with the first spoke 108(1) (e.g., an internet protocol (IP) address associated with the private network 112(1) and/or a tunnel endpoint associated with the private network 112(1)).

In some examples, the first 4-byte portion encoded with the tenant VNI and/or the routing requirement associated with the first spoke 108(1) and/or the route may be split into two segments. For example, the first 4-byte portion may include a first segment comprising 1-12 bits and/or a second segment comprising 20 bits. While a first 12-bit segment and a second segment are described, the first 4-byte portion may include any number of segment comprising any number of bits allowed by the 4-bytes. The second 20-bit segment may comprise a tenant VNI associated with a tenant node 118(1). In some examples, the first 12-bit segment may comprise a BitVector representing one or more services to be performed on network traffic and/or a chain of services to be performed on network traffic associated with the first spoke 108(1) and/or the tunneled connection 120(1). For example, each of the 12-bits included in the first segment may correspond to a particular service, where a "1" for a given bit may indicate that the corresponding service is to be applied (or performed) to the network traffic destined to and/or originating from the first spoke 108(1) and a "0" for a given bit may indicate that the corresponding service is not to be applied to the network traffic destined to and/or originating from the first spoke 108(1).

In some examples, when a spoke 108 and/or a tenant node 118 provisioned in a spoke network 112, 114 connects to a site 104 of the huh and spoke network 102 (e.g., comes online), the spoke 108 may transmit network routing information associated with the spoke 108 and/or the tenant node 118 to a hub node 106 provisioned in the same site 104 of the hub and spoke network 102 (e.g., hub node A 106(A) and the first spoke 108(1)). For example, one or more routing device(s) associated with a given spoke network 112, 114 may receive a tenant VNI for a given tenant node 118 in the spoke network 112, 114 and may encode the first 4-byte portion of the BGP large community string with the tenant VNI and/or the routing requirement indication. In some examples, a tenant VNI may be received from a hub node 106 provisioned locally to a given spoke 108 and/or from a database storing tenant VNIs. Additionally, or alternatively, the service chain BitVector may be received from a hub node 106 provisioned locally to a given spoke 108, from a database storing service chain BitVectors, and/or configured by a network administrator associated with the given spoke. Additionally, or alternatively, the one or more trust level indicator(s) may be received from a hub node 106 provisioned locally to a given spoke 108, from a database storing trust level indicator(s), and/or configured by a network administrator associated with the given spoke. The tenant VNI may be configured as a VNI label used for tenant traffic, such as, for example, MPLS, VXLAN, GENEVE, and/or any other network overlay protocol. The routing requirement may be configured as a service chain BitVector, as previously described. Additionally, or alternatively, the one or more routing device(s) may encode the second 4-byte portion of the BGP large community string with an indication of the VNI type of the given spoke 108, such as, for example, MPLS, VXLAN, GENEVE, and/or any other network overlay protocol. Additionally, or alternatively, the one or more routing device(s) may encode the third 4-byte portion of the BGP large community string with an IP version 4 (IPv4) address and/or an identifier of an IP version 6 (IPv6) address of the given spoke 108. In examples where the spoke 108 is associated with an IPv6 address, the IPv6 address may be mapped to a 4-byte identifier associated with a given spoke 108. In such examples, a given remote hub node 106 may be configured to perform a lookup using the 4-byte identifier to determine the IPv6 address of the originating spoke 108 based on the route the BGP large community string indicating that a given spoke 108 is configured for IPv6 routing.

A hub node 106 may be configured to decode network routing information from the various portions of the BGP large community string. In some examples, while decoding the network routing information, a hub node 106 may be configured to assume that the IP address included in the third portion of the BGP large community string is an IPv4 address, unless an indication is otherwise provided. A hub node 106 may be configured to determine such an indication by performing a lookup, based on a 4-byte identifier associated with a given remote hub node 106 encoded in the third portion of the BGP large community string (in place of the IPv4 address) to determine the IPv6 address associated with given remote hub node 106.

Additionally, or alternatively, a hub node 106 may be configured to store the network routing information associated with a given spoke 108 and/or a given tunneled connection (or route) as a mapping between the tenant VNI and/or the routing requirement, the indication of the VNI type of the given spoke 108, and/or the address associated with the hub node 106. Additionally, or alternatively, the mapping may include only the indication of the VNI type of the given spoke 108 and the address associated with the hub node 106. By storing the network routing information in this way, a remote hub node 106 may be configured to apply the network routing requirements associated with a remote spoke 108 when routing traffic to a local spoke 108 via a tunneled connection 120. For example, the remote hub node 106 may identify, based on the mapping, the tenant VNI associated with a source node and/or a corresponding routing requirement (e.g., a service chain BitVector) the VNI type associated with a remote spoke 108, and the address associated with the originating spoke 108, and utilize the routing requirement to make a routing decision, such as, for example, dropping a packet, sending a packet to a service node to apply one or more services 120 to the packet, and/or allowing a packet to be sent to a destination network.

At "1," hub node A 106(A) provisioned in network site A 104(A) and configured to transmit network traffic associated with a first spoke 108(1), may receive a network advertisement from the first spoke 108(1). In some examples, the network advertisement may be configured as a data packet and/or a BGP advertisement packet including a BGP large community string. Additionally, or alternatively, the network advertisement may be configured as a data packet including a BGP large community string. In some examples, the network advertisement may indicate a connection of the first spoke 108(1) to hub node A 106(A) and/or one or more routes associated with the first spoke 108(1), such as, for example, a first route associated with the BGP large community string. The BGP large community string may comprise various portions encoded with the information, such as, for example, a first 4-byte portion encoded with a tenant VNI associated with a tenant node 118(1) provisioned in the private network 112(1) connected by a tunneled connection 120(1) to the first spoke 108(1) and/or a service chain BitVector associated with the first spoke 108(1) and/or a route including the first spoke 108(1) (e.g., the tunneled connection 120(1)), a second 4-byte portion encoded with an indication of a virtual network instance (VNI) type associated with the private network 112(1) connected by the first spoke 108(1), and/or a third 4-byte portion encoded with an address associated with the first spoke 108(1) (e.g., an internet protocol (IP) address associated with the private spoke network 112(1) and/or a tunnel endpoint associated with the private network 112(1)).

At "2," hub node A 106(A) may decode and/or store the network routing information from various portions of the BGP large community string in a datastore 110(A). In some examples, hub node A 106(A) may store a first routing entry including the first route and the BGP large community string in a routing table of the datastore 110(A). For example, hub node A 106(A) may be configured to store the network routing information associated with the first spoke 108(1) and/or the tenant node 114(1) provisioned in the first spoke 108(1) as a mapping between the tenant VNI, the service chain BitVector, the indication of the VNI type of the first spoke 108(1), and/or the address associated with the first spoke 108(1). Additionally, or alternatively, the mapping may include only the indication of the VNI type of the first spoke 108(1) and the address associated with the first spoke 108(1).

Additionally, or alternatively, at "2," hub node A 106(A) may be configured to further advertise the network routing information to additional hub nodes (e.g., one or more hub node(s) N 106(N)) in the hub and spoke network. For example, hub node A 106(A) may send the network routing information and/or the BGP large community string to hub node N 106(N) provisioned in site N 104(N) of the hub and spoke network.

At "3," hub node A 106(A) may receive a packet from a source tenant node 118(1), hosted in a private network 112(1) connected to the first spoke 108(1) provisioned in site A 104(A), to be transmitted to a destination tenant node 118(2) hosted in a public network 114(1) connected to a second spoke 108(2) provisioned in site A 104(A). In some examples, the packet may include an inner header including next hop information for a destination tenant node 118(2) provisioned in a spoke network 114(2) and/or an outer header including next hop information for a given spoke node 108 of the hub and spoke overlay network 102. Hub node A 106(A) may receive the data packet from the first spoke 108(1) and identify the network routing information associated with the first spoke 108(1) that was previously stored in the site B database 110(B).

At "4," hub node A 106(A) may determine a transmission route to transmit the network traffic (e.g., the data packet) from the private network 112(1) connected by the tunneled connection 120(1) the first spoke 108(1) and to the destination tenant node 118(2) hosted in the public network 114(1) and connected by the tunneled connection 120(2) the second spoke 108(2). In some examples, hub node A 106(A) may determine that the transmission route includes the first route comprising the first tunneled connection 120(1) between the first spoke 108(1) and hub node A 106(A) and/or a second route comprising the second tunneled connection 120(2) between the second spoke 108(2) and hub node A 106(A). Hub node A 106(A) may perform a lookup in the datastore 110(A) based on the first route and/or the second route and identify corresponding network routing requirement(s) indicated by BGP large community strings to determine the transmission route. In some examples, the routing requirements may include a BitVector indicating a service chain representing one or more services 120 to be performed on the network traffic being sent via the transmission route.

At "5," hub node A 106(A) may identify, based on the transmission route, one or more services 120 to apply to the network traffic. In some examples, the one or more services 122 may be determined based at least in part on the VNI type of the private network 112(1) indicated by the first routing entry associated with the BGP large community string corresponding to the first spoke 108(1). Additionally, or alternatively, the one or more services 122 may be determined based at least in part on a VNI type of the public network 114(1) indicated by a second routing entry associated with a BGP large community string received from the second spoke 108(2). For example, as indicated by the key 124(A) in FIG. 1A, network traffic traveling to and/or from the first tunneled connection 120(1) may skip security services 122, while network traveling to and/or from the second tunneled connection 120(2) requires security services 122. As previously described, the service chain BitVector may indicate which of the one or more services to be applied to the network traffic and/or the order of the one or more services to be applied to the network traffic. The BitVector may indicate the one or more services by configuring each bit of the 12-bits to a particular service, where a "1" may indicate that the service is to be applied, and a "0" may indicate that the service is to be skipped.

At "6," hub node A 106(A) may send the network traffic to a service node of the hub and spoke network configured to apply at least a first service of the one or more services 122 to the network traffic associated with the transmission route. In some examples, the service node may apply the first service to the network traffic and send the network traffic to another service node to apply one or more second services to the network traffic. Additionally, or alternatively, the service node may apply all of the one or more services that the BitVector indicates is to be applied to the network traffic. Once the service(s) have been applied to the network traffic, the packet may be sent to the second spoke 108(2) for delivery to the destination node 118(2). Additionally, or alternatively, if the destination node is hosted remote from site A 104(A), the packet may be sent from the service node back to hub node A 106(A), where hub node A 106(A) may transmit the packet to a remote hub node 106(N) provisioned in a remote site 104(N) for delivery of the data packet.

FIG. 1B illustrates a system architecture diagram 100 of an example flow for a multi-site computing resource network 102 (e.g., a hub and spoke overlay network) including a hub node 106(A) in a first site 104(A) to receive a packet from a source spoke 108(1) to be transmitted to a destination spoke 108, determine a transmission route from the source spoke 108(1) to the destination spoke 108, and identify a trust level associated with a tunneled connection included in the transmission route.

The computing resource network 102 may comprise one or more data centers that include various networking components, such as, a network controller and/or network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a hub node 106, one or more spoke(s) 108(1)-(N) connecting one or more private spoke network(s) 112(1)-(N), one or more public spoke network(s) 114(1)-(N), and/or one or more internet access network(s) 116, and/or one or more tenant node(s) 118(1)-(N), where N may be any integer greater than 1.

Each of the spokes 108 of a given site 104 may provide a spoke network 112, 114, 116 access to a hub node 106 of the given site 104 via a tunneled connection 120. For example, a first hub node 106(A) provisioned in a first site 104(A) of the computing resource network 102 may be configured to route network traffic associated with a first spoke 108(1), a second spoke 108(2), a third spoke 108(3), and/or a fourth spoke 108(4) provisioned in the first site 104(A), such as, for example, network traffic originating from and/or destined to one or more tenant nodes 118(1), 118(2), 118(3) hosted in one or more spoke networks 112(1), 112(2), 114(1). Additionally, or alternatively, one or more second hub node(s) 106(N) provisioned in one or more second site(s) 104(N) of the computing resource network 102 may be configured to route network traffic associated with one or more fifth spoke(s) 108(5) and/or one or more sixth spoke(s) 108(N) provisioned in the one or more second site(s) 104(N), such as, for example, network traffic originating from and/or destined to one or more tenant nodes 118(4), 118(N) hosted in one or more spoke networks 112(N), 114(N). Additionally, or alternatively, the first hub node 106(A) and/or one or more second hub node(s) 106(N) may be communicatively coupled, such that they are configured to send network traffic to a given hub node 106 configured to route the network traffic to a destination spoke 110 provisioned in the same network site of the given hub node 106.

Take, for example, the computing resource network 102 configured as a hub and spoke overlay multiprotocol label switching (MPLS) network. As previously described, hub node A 106(A) may be provisioned in network site A 104(A) and configured to transmit network traffic associated with a first spoke 108(1), a second spoke 108(2), a third spoke 108(3), and/or a fourth spoke 108(4) provisioned in site A 104(A). For example, hub node A 106(A) may receive a packet from the first spoke 108(1). Hub node A 106(A) may be configured to decode network routing requirement(s) from a border gateway protocol (BGP) large community string associated with the packet and may store the network routing requirement(s) in a datastore 110(A) associated with the hub node and in association with the first spoke 108(1) connecting a first private network 112(1) to hub node A 106(A) via a tunneled connection 120(1). The routing requirement(s) may specify a trust level associated with the first spoke 108(1). In some examples, the trust level may be configured to segregate network traffic between various spokes 108. For example, a first trust level of the first spoke 108(1) may indicate whether network traffic may be sent to and/or received from a second spoke 108(2) having a second trust level.

Additionally, or alternatively, hub node A 106(A) may be configured to further advertise network routing information to additional hub nodes 106(N) in the hub and spoke network 102. For example, hub node A 106(A) may send the network routing information and/or the BGP large community string to hub node N 106(N) provisioned in site N 104(N) of the hub and spoke network 102, where hub node N 106(N) may decode and/or store the network routing requirements in association with the given route (or the tunneled connection 120) in a database associated with hub node N 106(N). By configuring hub nodes 106 to advertise such routing requirements indicated by the BGP large community strings with other hub nodes 106 in the network 102, each hub node 106 may be aware of the network routing information associated with remote spokes 108 provisioned in remote sites 104, thus allowing for implementation of the network routing requirements (e.g., the trust level restrictions) when sending network traffic between remote sites 104 of the network 102.

The network routing information may be received as a network advertisement. In some examples, the network advertisement may be configured as a data packet, an advertisement packet, and/or an application programming interface (API) call, such as, for example, a representational state transfer (REST) API call including details for configuring a given spoke network 112, 114, 116 with the computing resource network 102. In some examples, the network advertisement may comprise a border gateway protocol (BGP) large community string associated with a tunneled connection 120 connecting a given spoke 108 to a given hub node 106. The BGP large community string may comprise various portions encoded with the information, such as, for example, a first 4-byte portion encoded with a tenant VNI associated with a tenant node 118(1) provisioned in the private network 112(1) connected by a tunneled connection 120(1) to the first spoke 108(1) and/or a routing requirement associated with the first spoke 108(1) and/or the tunneled connection 120(1), a second 4-byte portion encoded with an indication of a virtual network instance (VNI) type associated with the private network 112(1) connected by the first spoke 108(1), and/or a third 4-byte portion encoded with an address associated with the first spoke 108(1) (e.g., an internet protocol (IP) address associated with the private network 112(1) and/or a tunnel endpoint associated with the private network 112(1))).

In some examples, the first 4-byte portion encoded with the tenant VNI and/or the routing requirement associated with the first spoke 108(1) and/or the route may be split into two segments. For example, the first 4-byte portion may include a first segment comprising 1-12 bits and/or a second segment comprising 20 bits. While a first 12-bit segment and a second segment are described, the first 4-byte portion may include any number of segment comprising any number of bits allowed by the 4-bytes. The second 20-bit segment may comprise a tenant VNI associated with a tenant node 118(1). In some examples, the first 12-bit segment may comprise a single bit indicating a trust level associated with the first spoke 108(1). For example, the first spoke 108(1) may be connected to a private network 112(1) via a first tunneled connection 120(1) and a second spoke 108(2) may be connected to a public network 114(1) via a second tunneled connection 120(2). The first spoke 108(1) may be associated with a first trust level (e.g., indicated by an integer, string of integers, or the like) and the second spoke 108(2) may be associated with a second trust level. In some examples, the first trust level may be configured to allow network traffic to and/or from a spoke 108 associated with the first trust level and disallow (e.g., cause packets to be dropped) network traffic to and/or from a spoke 108 associated with a different trust level.

At "1," hub node A 106(A) provisioned in network site A 104(A) may receive a packet. In some examples, the network advertisement may be configured as a data packet and/or a BGP advertisement packet including a BGP large community string. Additionally, or alternatively, the network advertisement may be configured as a data packet including a BGP large community string. In some examples, the network advertisement may indicate a first tunneled connection 120(1) connecting a first network configured as a private network 112(1) to hub node A 104(A) by way of a first spoke 108(1). The BGP large community string may comprise various portions encoded with the information, such as, for example, a first 4-byte portion encoded with a tenant VNI associated with a tenant node 118(1) provisioned in the private network 112(1) connected by the first tunneled connection 120(1) to the first spoke 108(1) and/or a first trust level associated with the first spoke 108(1) and/or the first tunneled connection 120(1), a second 4-byte portion encoded with an indication of a virtual network instance (VNI) type associated with the private network 112(1) connected by the first spoke 108(1), and/or a third 4-byte portion encoded with an address associated with the first spoke 108(1) (e.g., an internet protocol (IP) address associated with the private network 112(1) and/or a tunnel endpoint associated with the private network 112(1))).

At "2," hub node A 106(A) may decode and/or store the network routing information from various portions of the BGP large community string in a datastore 110(A). In some examples, hub node A 106(A) may store a first routing entry including the first tunneled connection 120(1) and the first BGP large community string in a routing table of the datastore 110(A). For example, hub node A 106(A) may be configured to store the network routing information associated with the first spoke 108(1) and/or the tenant node 114(1) provisioned in the first spoke 108(1) as a mapping between the tenant VNI, the first trust level, the indication of the VNI type of the first spoke 108(1), and/or the address associated with the first spoke 108(1). Additionally, or alternatively, the mapping may include only the indication of the VNI type of the first spoke 108(1) and the address associated with the first spoke 108(1).

Additionally, or alternatively, at "2," hub node A 106(A) may be configured to further advertise the network routing information to additional hub nodes (e.g., one or more hub node(s) N 106(N)) in the hub and spoke network. For example, hub node A 106(A) may send the network routing information and/or the BGP large community string to hub node N 106(N) provisioned in site N 104(N) of the hub and spoke network.

At "3," hub node A 106(A) may receive a data packet from a source tenant node 118(1), hosted in a private network 112(1) connected to the first spoke 108(1) provisioned in site A 104(A), to be transmitted to a destination tenant node 118(2) hosted in a public network 114(1) connected to a second spoke 108(2) provisioned in site A 104(A). Hub node A 106(A) may receive the data packet from the first spoke 108(1) and identify the network routing information associated with the first spoke 108(1) that was previously stored in the site B database 110(B).

At "4," hub node A 106(A) may determine a transmission route to transmit the network traffic (e.g., the data packet) from the private network 112(1) connected by the tunneled connection 120(1) the first spoke 108(1) and to the destination tenant node 118(2) hosted in the public network 114(1) and connected by the tunneled connection 120(2) the second spoke 108(2). In some examples, hub node A 106(A) may determine that the transmission route includes the first tunneled connection 120(1) between the first spoke 108(1) and hub node A 106(A) and/or a second tunneled connection 120(2) between the second spoke 108(2) and hub node A 106(A). Hub node A 106(A) may perform a lookup in the datastore 110(A) based on the first tunneled connection 120(1) and/or the second tunneled connection 120(2) and identify corresponding network routing requirement(s) indicated by BGP large community strings to determine the transmission route. In some examples, the routing requirements may include one or more trust levels associated with the transmission route.

At "5," hub node A 106(A) may identify, based on the routing requirements associated with the transmission route, a first trust level associated with the first spoke 108(1) and/or the first tunneled connection 120(1) and/or a second trust level associated with the second spoke 108(2) and/or the second tunneled connection 120(2). As illustrated by the key 124(B), the first trust level associated with the first tunneled connection 120(1) may indicate that traffic from the first tunneled connection 120(1) may only go to a tunneled connection 120 having the same trust level (e.g., a tunneled connection 120(3), 120(5) associated with another private network 112(2), 112(N)). Additionally, or alternatively, as illustrated by the key 124(B), the second trust level associated with the second tunneled connection 120(2) may indicate that traffic from the second tunneled connection 120(1) may only go to a tunneled connection 120 having the same trust level (e.g., a tunneled connection 120(4), 120(N) associated with another unsecured network 114(N), 116).

At "6," hub node A 106(A) may determine a routing action for the packet based on the routing requirements associated with the transmission route. For example, hub node A 106(A) may utilize the first trust level and the second trust level to determine whether to send the data packet to the destination node 118(2) using the second tunneled connection 120(2) or to drop the data packet. In some examples, hub node A 106(A) may determine that the first trust level and/or the second trust level are configured to segregate traffic from one another and may drop the packet. Additionally, or alternatively, hub node A 106(A) may determine that the first trust level and/or the second trust level are configured to allow network traffic to be transmitted between one another and may send the data packet to the first destination node 118(2) using the second tunneled connection 120(2). In the example illustrated by FIG. 1B, hub node A 106(A) may drop the packet based on the first trust level and the second trust level being configured to segregate the network traffic between the first spoke 108(1) and the second spoke 108(2). However, take, for example, the destination node 118 being provisioned in a private network, such as, destination node 118(3) hosted in a second private network 112(3) connected to a third spoke 108(3) by way of a third tunneled connection 120(3). In such a scenario, hub node A 106(A) may determine that the third tunneled connection 120(3) is associated with the first trust level, and as such, hub node A 106(A) may send the data packet to the destination node 118(3) using the third tunneled connection 120(3).

FIG. 1C illustrates a system architecture diagram 100 of an example flow for a multi-site computing resource network 102 (e.g., a hub and spoke overlay network) including a hub node 106(A) in a first site 104(A) to receive a packet from a source spoke 108(1) to be transmitted to a destination spoke 108, determine a transmission route from the source spoke 108(1) to the destination spoke 108, and identify a trust zone associated with a tunneled connection included in the transmission route.

The computing resource network 102 may comprise one or more data centers that include various networking components, such as, a network controller and/or network switches (also referred to as nodes) operating on physical servers. In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a hub node 106, one or more spoke(s) 108(1)-(N) connecting one or more private spoke network(s) 112(1)-(N), one or more public spoke network(s) 114(1)-(N), and/or one or more internet access network(s) 116, and/or one or more tenant node(s) 118(1)-(N), where N may be any integer greater than 1.

Each of the spokes 108 of a given site 104 may provide a spoke network 112, 114, 116 access to a hub node 106 of the given site 104 via a tunneled connection 120. For example, a first hub node 106(A) provisioned in a first site 104(A) of the computing resource network 102 may be configured to route network traffic associated with a first spoke 108(1), a second spoke 108(2), a third spoke 108(3), and/or a fourth spoke 108(4) provisioned in the first site 104(A), such as, for example, network traffic originating from and/or destined to one or more tenant nodes 118(1), 118(2), 118(3) hosted in one or more spoke networks 112(1), 112(2), 114(1). Additionally, or alternatively, one or more second hub node(s) 106(N) provisioned in one or more second site(s) 104(N) of the computing resource network 102 may be configured to route network traffic associated with one or more fifth spoke(s) 108(5) and/or one or more sixth spoke(s) 108(N) provisioned in the one or more second site(s) 104(N), such as, for example, network traffic originating from and/or destined to one or more tenant nodes 118(4), 118(N) hosted in one or more spoke networks 112(N), 114(N). Additionally, or alternatively, the first hub node 106(A) and/or one or more second hub node(s) 106(N) may be communicatively coupled, such that they are configured to send network traffic to a given hub node 106 configured to route the network traffic to a destination spoke 110 provisioned in the same network site of the given hub node 106.

Take, for example, the computing resource network 102 configured as a hub and spoke overlay multiprotocol label switching (MPLS) network. As previously described, hub node A 106(A) may be provisioned in network site A 104(A) and configured to transmit network traffic associated with a first spoke 108(1), a second spoke 108(2), a third spoke 108(3), and/or a fourth spoke 108(4) provisioned in site A 104(A). For example, hub node A 106(A) may receive a packet from the first spoke 108(1). Hub node A 106(A) may be configured to decode network routing requirement(s) from a border gateway protocol (BGP) large community string associated with the packet and may store the network routing requirement(s) in a datastore 110(A) associated with the hub node and in association with the first spoke 108(1) connecting a first private network 112(1) to hub node A 106(A) via a tunneled connection 120(1). The routing requirement(s) may specify a trust level and/or a trust zone associated with the first spoke 108(1). In some examples, the trust level and/or the trust zone may be configured to segregate network traffic between various spokes 108. For example, a first trust level of the first spoke 108(1) may indicate whether network traffic may be sent to and/or received from a second spoke 108(2) having a second trust level. Additionally, or alternatively, a first trust zone associated with the first spoke 108(1) may indicate whether network traffic may be sent to and/or received from one or more second spokes 108 having various trust levels and/or trust zones.

Additionally, or alternatively, hub node A 106(A) may be configured to further advertise network routing information to additional hub nodes 106(N) in the hub and spoke network 102. For example, hub node A 106(A) may send the network routing information and/or the BGP large community string to hub node N 106(N) provisioned in site N 104(N) of the hub and spoke network 102, where hub node N 106(N) may decode and/or store the network routing requirements in association with the given route (or the tunneled connection 120) in a database associated with hub node N 106(N). By configuring hub nodes 106 to advertise such routing requirements indicated by the BGP large community strings with other hub nodes 106 in the network 102, each hub node 106 may be aware of the network routing information associated with remote spokes 108 provisioned in remote sites 104, thus allowing for implementation of the network routing requirements (e.g., the trust level restrictions) when sending network traffic between remote sites 104 of the network 102.

The network routing information may be received as a network advertisement. In some examples, the network advertisement may be configured as a data packet, an advertisement packet, and/or an application programming interface (API) call, such as, for example, a representational state transfer (REST) API call including details for configuring a given spoke network 112, 114, 116 with the computing resource network 102. In some examples, the network advertisement may comprise a border gateway protocol (BGP) large community string associated with a tunneled connection 120 connecting a given spoke 108 to a given hub node 106. The BGP large community string may comprise various portions encoded with the information, such as, for example, a first 4-byte portion encoded with a tenant VNI associated with a tenant node 118(1) provisioned in the private network 112(1) connected by a tunneled connection 120(1) to the first spoke 108(1) and/or a routing requirement associated with the first spoke 108(1) and/or the tunneled connection 120(1), a second 4-byte portion encoded with an indication of a virtual network instance (VNI) type associated with the private network 112(1) connected by the first spoke 108(1), and/or a third 4-byte portion encoded with an address associated with the first spoke 108(1) (e.g., an internet protocol (IP) address associated with the private network 112(1) and/or a tunnel endpoint associated with the private network 112(1)).

In some examples, the first 4-byte portion encoded with the tenant VNI and/or the routing requirement associated with the first spoke 108(1) and/or the route may be split into two segments. For example, the first 4-byte portion may include a first segment comprising 1-12 bits and/or a second segment comprising 20 bits. While a first 12-bit segment and a second segment are described, the first 4-byte portion may include any number of segment comprising any number of bits allowed by the 4-bytes. The second 20-bit segment may comprise a tenant VNI associated with a tenant node 118(1). In some examples, the first 12-bit segment may comprise a single bit indicating a trust level associated with the first spoke 108(1) and/or 1-12 bits indicating a trust zone associated with the first spoke 108(1). For example, the first spoke 108(1) may be connected to a private network 112(1) via a first tunneled connection 120(1) and a second spoke 108(2) may be connected to a public network 114(1) via a second tunneled connection 120(2). The first spoke 108(1) may be associated with a first trust level (e.g., indicated by an integer, string of integers, or the like) and the second spoke 108(2) may be associated with a second trust level. In some examples, the first trust level may be configured to allow network traffic to and/or from a spoke 108 associated with the first trust level and disallow (e.g., cause packets to be dropped) network traffic to and/or from a spoke 108 associated with a different trust level. Additionally, or alternatively, the first spoke 108(1) may be associated with a first trust zone (e.g., one or more trust levels, a range of trust levels, and/or the like). In some examples, the first trust zone may be configured to allow network traffic to and/or from a spoke 108 associated with the first trust level and/or a third trust level and disallow network traffic to and/or from a spoke 108 associated with the second trust level.

At "1," hub node A 106(A) provisioned in network site A 104(A) may receive a packet. In some examples, the network advertisement may be configured as a data packet and/or a BGP advertisement packet including a BGP large community string. Additionally, or alternatively, the network advertisement may be configured as a data packet including a BGP large community string. In some examples, the network advertisement may indicate a first tunneled connection 120(1) connecting a first network configured as a private network 112(1) to hub node A 104(A) by way of a first spoke 108(1). The BGP large community string may comprise various portions encoded with the information, such as, for example, a first 4-byte portion encoded with a tenant VNI associated with a tenant node 118(1) provisioned in the private network 112(1) connected by the first tunneled connection 120(1) to the first spoke 108(1) and/or a first trust zone associated with the first spoke 108(1) and/or the first tunneled connection 120(1), a second 4-byte portion encoded with an indication of a virtual network instance (VNI) type associated with the private network 112(1) connected by the first spoke 108(1), and/or a third 4-byte portion encoded with an address associated with the first spoke 108(1) (e.g., an internet protocol (IP) address associated with the private network 112(1) and/or a tunnel endpoint associated with the private network 112(1)).

At "2," hub node A 106(A) may decode and/or store the network routing information from various portions of the BGP large community string in a datastore 110(A). In some examples, hub node A 106(A) may store a first routing entry including the first tunneled connection 120(1) and the first BGP large community string in a routing table of the datastore 110(A). For example, hub node A 106(A) may be configured to store the network routing information associated with the first spoke 108(1) and/or the tenant node 114(1) provisioned in the first spoke 108(1) as a mapping between the tenant VNI, the first trust zone, the indication of the VNI type of the first spoke 108(1), and/or the address associated with the first spoke 108(1). Additionally, or alternatively, the mapping may include only the indication of the VNI type of the first spoke 108(1) and the address associated with the first spoke 108(1).

Additionally, or alternatively, at "2," hub node A 106(A) may be configured to further advertise the network routing information to additional hub nodes (e.g., one or more hub node(s) N 106(N)) in the hub and spoke network. For example, hub node A 106(A) may send the network routing information and/or the BGP large community string to hub node N 106(N) provisioned in site N 104(N) of the hub and spoke network.

At "3," hub node A 106(A) may receive a packet from a source tenant node 118(1), hosted in a private network 112(1) connected to the first spoke 108(1) provisioned in site A 104(A), to be transmitted to a destination tenant node 118(2) hosted in a public network 114(1) connected to a second spoke 108(2) provisioned in site A 104(A). Hub node A 106(A) may receive the data packet from the first spoke 108(1) and identify the network routing information associated with the first spoke 108(1) that was previously stored in the site B database 110(B).

At "4," hub node A 106(A) may determine a transmission route to transmit the network traffic (e.g., the data packet) from the private network 112(1) connected by the tunneled connection 120(1) the first spoke 108(1) and to the destination tenant node 118(2) hosted in the public network 114(1) and connected by the tunneled connection 120(2) the second spoke 108(2). In some examples, hub node A 106(A) may determine that the transmission route includes the first tunneled connection 120(1) between the first spoke 108(1) and hub node A 106(A) and/or a second tunneled connection 120(2) between the second spoke 108(2) and hub node A 106(A). Hub node A 106(A) may perform a lookup in the datastore 110(A) based on the first tunneled connection 120(1) and/or the second tunneled connection 120(2) and identify corresponding network routing requirement(s) indicated by BGP large community strings to determine the transmission route. In some examples, the routing requirements may include one or more trust zones associated with the transmission route.

At "5," hub node A 106(A) may identify, based on the routing requirements associated with the transmission route, a first trust zone associated with the first spoke 108(1) and/or the first tunneled connection 120(1) and/or a second trust zone associated with the second spoke 108(2) and/or the second tunneled connection 120(2). In some examples, a trust zone may indicate one or more trust levels in which network traffic may be allowed (e.g., a first trust zone may comprise a first trust level and a second trust level and may exclude a third trust level and/or may comprise a second trust zone and exclude a third trust zone). As illustrated by the key 124(C), the first trust zone associated with the first tunneled connection 120(1) may indicate that traffic from the first tunneled connection 120(1) may be routed to a tunneled connection 120 having any trust level and/or trust zone. Additionally, or alternatively, as illustrated by the key 124(C), the second trust zone associated with the second tunneled connection 120(2) may indicate that traffic from the second tunneled connection 120(1) may only go to a tunneled connection 120 having the same trust level and/or trust zone (e.g., a tunneled connection 120(4), 120(N) associated with another unsecured network 114(N), 116).

At "6," hub node A 106(A) may determine a routing action for the packet based on the routing requirements associated with the transmission route. For example, hub node A 106(A) may utilize the first trust zone and the second trust zone to determine whether to send the data packet to the destination node 118(2) using the second tunneled connection 120(2) or to drop the data packet. In some examples, hub node A 106(A) may determine that the first trust zone is configured such that network traffic originating from the associated tunneled connection 120(1) may be sent to any other tunneled connection 120 having any trust zone and may send the data packet to the first destination node 118(2) using the second tunneled connection 120(2). Additionally, or alternatively, hub node A 106(A) may determine that a given trust zone is configured to only allow network traffic from a tunneled connection 120 having the same trust zone as the given trust zone, and may drop the data packet. In the example illustrated by FIG. 1C, hub node A 106(A) may send the packet to the destination node 118(2) using the second tunneled connection 120(2) based on the first trust zone being configured to be sent to any tunneled connection 120 having any trust zone and/or trust level. However, take, for example, the source of the data packet being connected to a third spoke 108(3) by way of a third tunneled connection 120(3) having a third trust zone configured such that network traffic from the tunneled connection 120(3) may only be routed to a tunneled connection 120 having the same trust zone. In such a scenario, hub node A 106(A) may determine that the third tunneled connection 120(3) is associated with the third trust zone and the second tunneled connection 120(2) is associated with the second trust zone, and as such, hub node A 106(A) may drop the data packet.

Figure 2A:
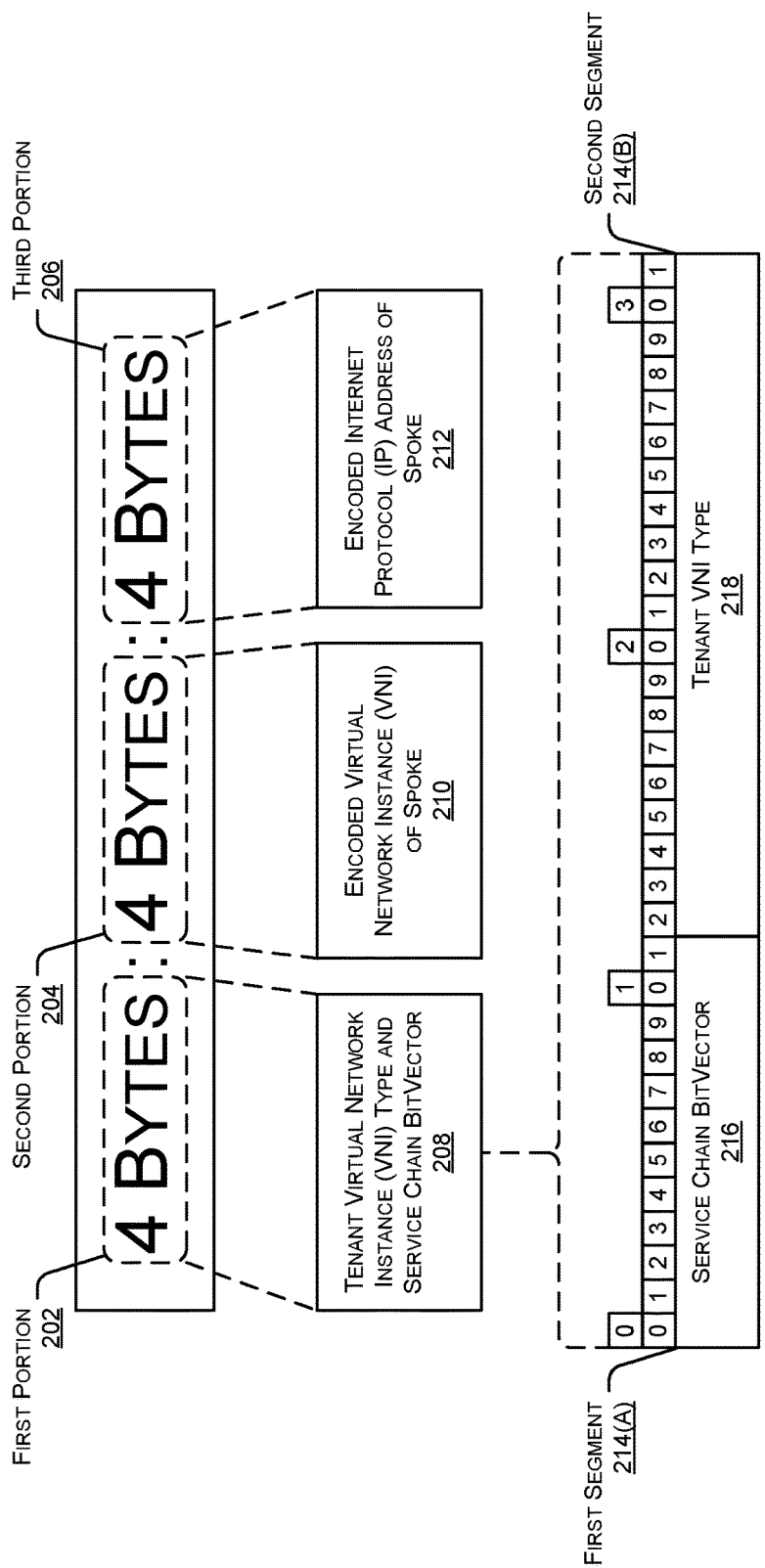
FIG. 2A illustrates an example border gateway protocol (BGP) large community including three 4-byte sections indicating a tenant virtual network instance (VNI) and a service chain BitVector, an encoded VNI type of a spoke, and/or an address of a tunnel endpoint associated with an originating spoke.

FIG. 2A illustrates an example border gateway protocol (BGP) large community string 200 including a first 4-byte portion 202, a second 4-byte portion 204, and/or a third 4-byte portion 206. In some examples, the portions 202, 204, and/or 206 of the BGP large community string 200 may indicate an encoded tenant VNI and a service chain BitVector 208 associated with a tenant node provisioned in a spoke network, an encoded VNI type and/or VNI associated with a spoke 210, and/or an encoded internet protocol (IP) address 212 associated with a spoke.

As described with respect to FIG. 1A, one or more routing device(s) associated with a given spoke network may receive a tenant VNI 218 for a given tenant node in the spoke network and may encode the first 4-byte portion 202 of the BGP large community string 200 with the tenant VNI and/or a service chain BitVector associated with the given spoke 208, described in more detail below. In some examples, a tenant VNI 218 may be received from a hub node provisioned locally to a given spoke and/or from a database storing tenant VNIs. Additionally, or alternatively, the service chain BitVector 216 may be received from a hub node provisioned locally to a given spoke, from a database storing service chain BitVectors 216, and/or configured by a network administrator associated with the given spoke. The tenant VNI 218 may be configured as a VNI label corresponding to the VNI type of the given spoke, such as, for example, MPLS, VXLAN, GENEVE, and/or any other network overlay protocol. Additionally, or alternatively, the one or more routing device(s) may encode the second 4-byte portion 204 of the BGP large community string 200 with an indication of the VNI type of the given spoke 210, such as, for example, MPLS, VXLAN, GENEVE, and/or any other network overlay protocol. Additionally, or alternatively, the one or more routing device(s) may encode the third 4-byte portion 206 of the BGP large community string 200 with an IP version 4 (IPv4) address and/or an identifier of an IP version 6 (IPv6) address of the given spoke 212. In examples where the spoke is associated with an IPv6 address, the IPv6 address may be mapped to a 4-byte identifier associated with a given spoke. In such examples, a given remote hub node may be configured to perform a lookup using the 4-byte identifier to determine the IPv6 address of the given spoke based on the route the BGP large community string indicating that a given spoke is configured for IPv6 routing.

In some examples, the first 4-byte portion 202 encoded with the tenant VNI and/or the service chain BitVector 208 associated with the spoke and/or tenant node may be split into two segments (e.g., 214(A),(B)). For example, the first 4-byte portion 202 may include a first segment 214(A) comprising 1-12 bits and/or a second segment 214(B) comprising 20 bits. While a first 12-bit segment 214(A) and a second 20-bit segment 214(B) are described, the first 4-byte portion 202 may include any number of segment 214 comprising any number of bits allowed by the 4-bytes. The second 20-bit segment 214(B) may comprise a tenant VNI 218 associated with a tenant node.

As illustrated in FIG. 2A, the first 12-bit segment 214(A) may comprise a service chain BitVector 216 representing one or more services to be performed on network traffic and/or a chain of services to be performed on network traffic associated with a given spoke. For example, each of the 12-bits included in the first segment 214(A) may correspond to a particular service, where a "1" for a given bit may indicate that the corresponding service is to be applied (or performed) to the network traffic destined to and/or originating from a given spoke and a "0" for a given bit may indicate that the corresponding service is not to be applied to the network traffic destined to and/or originating from a given spoke.

Figure 2B:
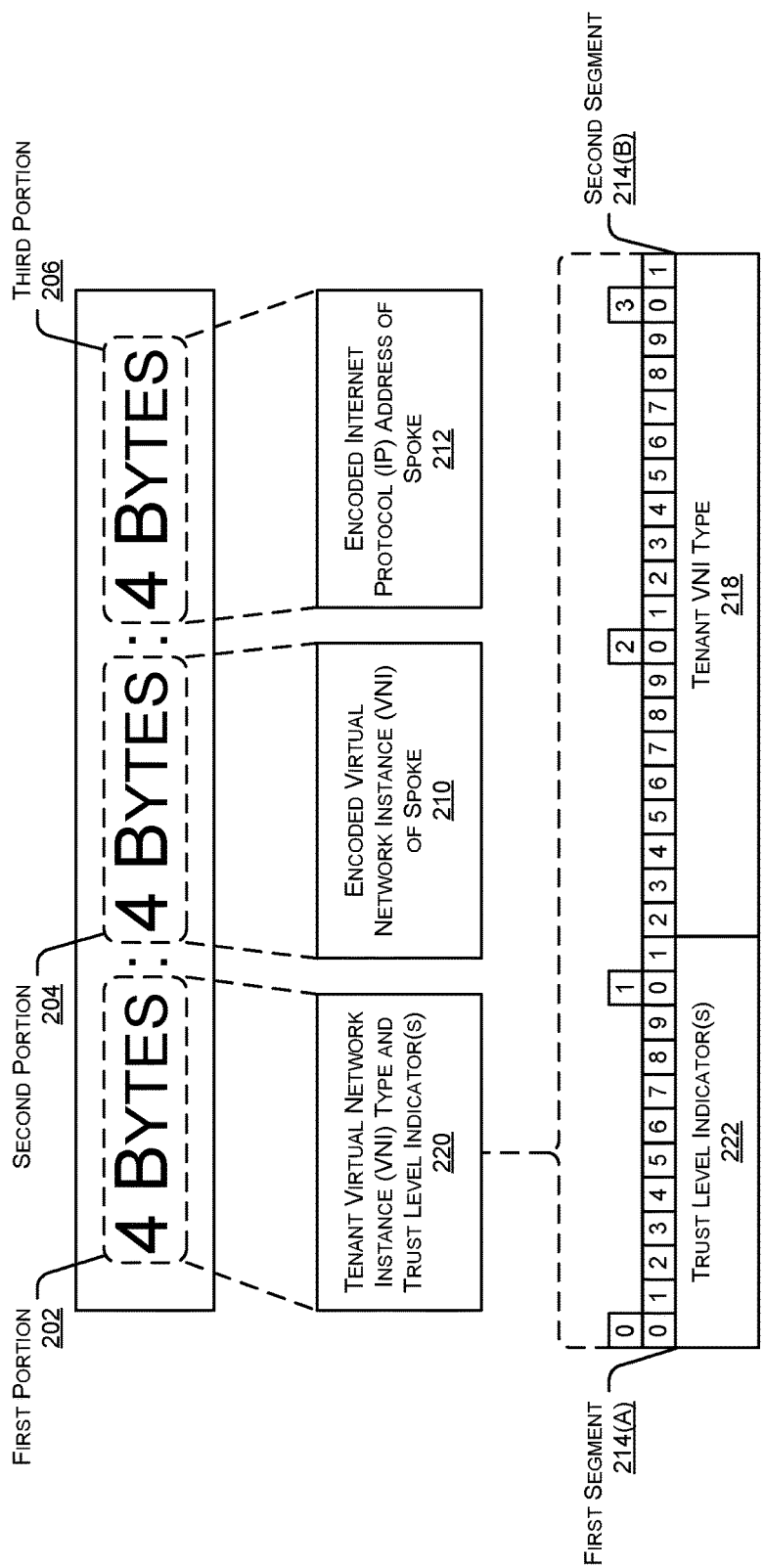
FIG. 2B illustrates an example border gateway protocol (BGP) large community including three 4-byte sections indicating a tenant virtual network instance (VNI) and trust level indicator(s), an encoded VNI type of a spoke, and/or an address of a tunnel endpoint associated with an originating spoke.

FIG. 2B illustrates another example border gateway protocol (BGP) large community string 200 including a first 4-byte portion 202, a second 4-byte portion 204, and/or a third 4-byte portion 206. In some examples, the portions 202, 204, and/or 206 of the BGP large community string 200 may indicate an encoded tenant VNI and trust level indicator(s) 220 (or a trust zone indicator) associated with a tenant node provisioned in a spoke network, an encoded VNI type and/or VNI associated with a spoke 210, and/or an encoded internet protocol (IP) address 212 associated with a spoke.

As described with respect to FIGS. 1B and 1C, one or more routing device(s) associated with a given spoke network may receive a tenant VNI 218 for a given tenant node in the spoke network and may encode the first 4-byte portion 202 of the BGP large community string 200 with the tenant VNI and/or one or more trust level indicator(s) associated with the given spoke 220, described in more detail below. In some examples, a tenant VNI 218 may be received from a hub node provisioned locally to a given spoke and/or from a database storing tenant VNIs. Additionally, or alternatively, the one or more trust level indicator(s) 222 may be received from a hub node provisioned locally to a given spoke, from a database storing trust level indicator(s) 222, and/or configured by a network administrator associated with the given spoke. The tenant VNI 218 may be configured as a VNI label corresponding to the VNI type of the given spoke, such as, for example, MPLS, VXLAN, GENEVE, and/or any other network overlay protocol. Additionally, or alternatively, the one or more routing device(s) may encode the second 4-byte portion 204 of the BGP large community string 200 with an indication of the VNI type of the given spoke 210, such as, for example, MPLS, VXLAN, GENEVE, and/or any other network overlay protocol. Additionally, or alternatively, the one or more routing device(s) may encode the third 4-byte portion 206 of the BGP large community string 200 with an IP version 4 (IPv4) address and/or an identifier of an IP version 6 (IPv6) address of the given spoke 212. In examples where the given spoke is associated with an IPv6 address, the IPv6 address may be mapped to a 4-byte identifier associated with a given spoke. In such examples, a given remote hub node may be configured to perform a lookup using the 4-byte identifier to determine the IPv6 address of the originating spoke based on the route the BGP large community string indicating that a given spoke is configured for IPv6 routing.

In some examples, the first 4-byte portion 202 encoded with the tenant VNI and/or the trust level indicator(s) 220 associated with the spoke and/or tenant node may be split into two segments (e.g., 214(A),(B)). For example, the first 4-byte portion 202 may include a first segment 214(A) comprising 1-12 bits and/or a second segment 214(B) comprising 20 bits. While a first 12-bit segment 214(A) and a second 20-bit segment 214(B) are described, the first 4-byte portion 202 may include any number of segment 214 comprising any number of bits allowed by the 4-bytes. The second 20-bit segment 214(B) may comprise a tenant VNI 218 associated with a tenant node.

As illustrated in FIG. 2B, the first 12-bit segment may comprise one or more trust level indicator(s) 222, such as, for example, a single bit indicating a trust level associated with a given spoke and/or 1-12 bits indicating a trust zone associated with a given spoke. For example, a first spoke may connect to a private network and a second spoke may connect to a public network. The first spoke may be associated with a first trust level (e.g., indicated by an integer, string of integers, or the like) and the second spoke may be associated with a second trust level. In some examples, the first trust level may be configured to allow network traffic to and/or from a spoke associated with the first trust level and disallow (e.g., cause packets to be dropped) network traffic to and/or from a spoke associated with a different trust level. Additionally, or alternatively, the first spoke may be associated with a first trust zone (e.g., one or more trust levels, a range of trust levels, and/or the like). In some examples, the first trust zone may be configured to allow network traffic to and/or from a spoke associated with the first trust level and/or a third trust level and disallow network traffic to and/or from a spoke associated with the second trust level.

Figure 2C:
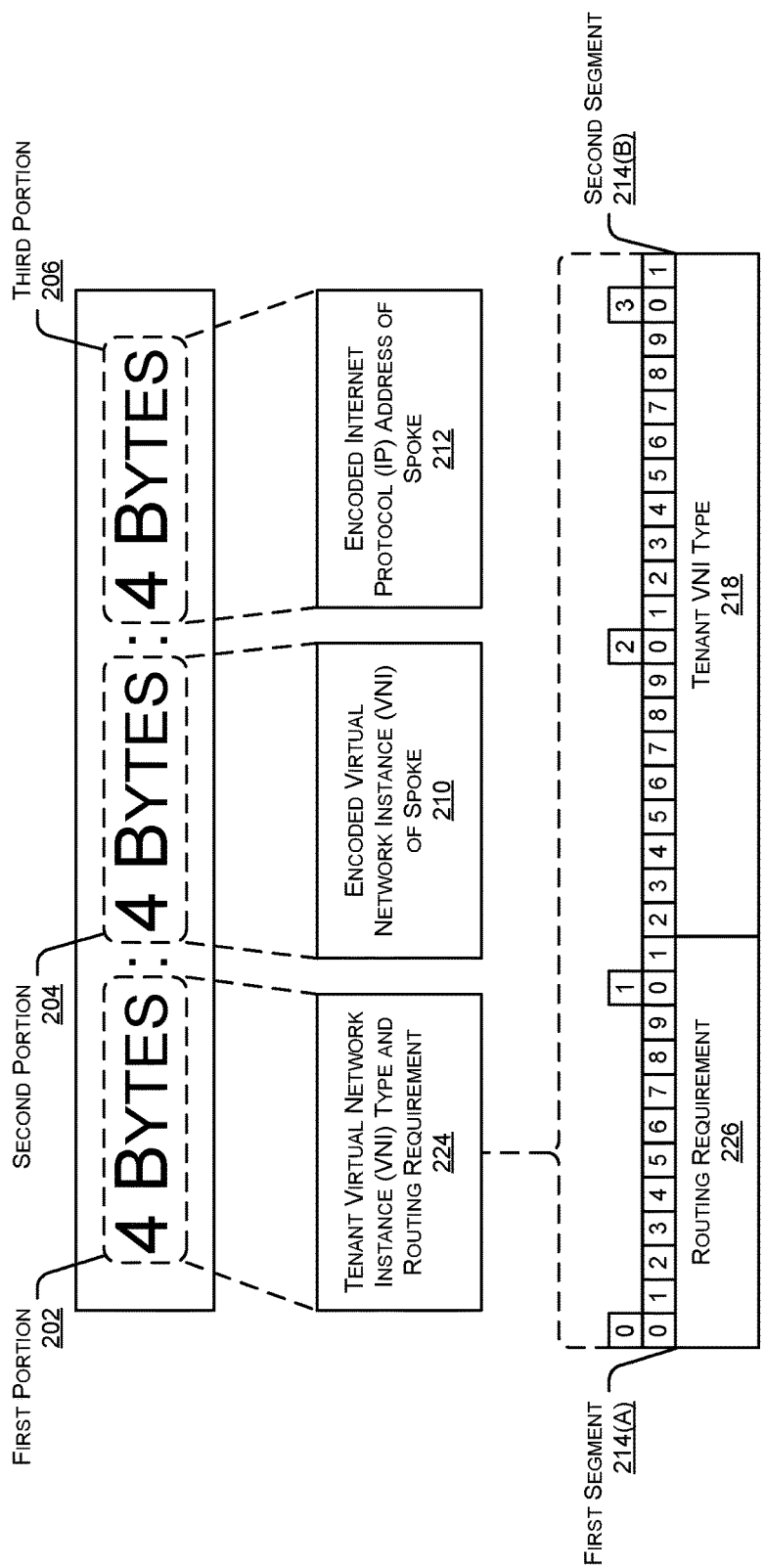
FIG. 2C illustrates an example border gateway protocol (BGP) large community including three 4-byte sections indicating a tenant virtual network instance (VNI) and routing requirements, an encoded VNI type of a spoke, and/or an address of a tunnel endpoint associated with an originating spoke.

FIG. 2C illustrates another example border gateway protocol (BGP) large community string 200 including a first 4-byte portion 202, a second 4-byte portion 204, and/or a third 4-byte portion 206. In some examples, the portions 202, 204, and/or 206 of the BGP large community string 200 may indicate an encoded tenant VNI and/or a routing requirement 224 associated with a tenant node provisioned in a spoke network, an encoded VNI type and/or VNI associated with a spoke 210, and/or an encoded internet protocol (IP) address 212 associated with a spoke.

As described with respect to FIGS. 1A-C, one or more routing device(s) associated with a given spoke network may receive a tenant VNI 218 for a given tenant node in the spoke network and may encode the first 4-byte portion 202 of the BGP large community string 200 with the tenant VNI and/or a routing requirement associated with the given spoke 224, described in more detail below. In some examples, a tenant VNI 218 may be received from a hub node provisioned locally to a given spoke and/or from a database storing tenant VNIs. Additionally, or alternatively, the routing requirement 226 may be received from a hub node provisioned locally to a given spoke, from a database storing routing requirements 226 and/or configured by a network administrator associated with the given spoke. The tenant VNI 218 may be configured as a VNI label corresponding to the VNI type of the given spoke, such as, for example, MPLS, VXLAN, GENEVE, and/or any other network overlay protocol. Additionally, or alternatively, the one or more routing device(s) may encode the second 4-byte portion 204 of the BGP large community string 200 with an indication of the VNI type of the given spoke 210, such as, for example, MPLS, VXLAN, GENEVE, and/or any other network overlay protocol. Additionally, or alternatively, the one or more routing device(s) may encode the third 4-byte portion 206 of the BGP large community string 200 with an IP version 4 (IPv4) address and/or an identifier of an IP version 6 (IPv6) address of the given spoke 212. In examples where the spoke is associated with an IPv6 address, the IPv6 address may be mapped to a 4-byte identifier associated with a given spoke. In such examples, a given remote hub node may be configured to perform a lookup using the 4-byte identifier to determine the IPv6 address of the given spoke based on the route the BGP large community string indicating that a given spoke is configured for IPv6 routing.

In some examples, the first 4-byte portion 202 encoded with the tenant VNI and/or the routing requirement 224 associated with the spoke and/or tenant node may be split into two segments (e.g., 214(A),(B)). For example, the first 4-byte portion 202 may include a first segment 214(A) comprising 1-12 bits and/or a second segment 214(B) comprising 20 bits. While a first 12-bit segment 214(A) and a second 20-bit segment 214(B) are described, the first 4-byte portion 202 may include any number of segment 214 comprising any number of bits allowed by the 4-bytes. The second 20-bit segment 214(B) may comprise a tenant VNI 218 associated with a tenant node.

As illustrated in FIG. 2A, the first 12-bit segment 214(A) may comprise a routing requirement 226 comprising a service chain BitVector, one or more trust levels, and/or one or more trust zones associated with a given spoke. For example, a first bit of the 12-bits included in the first segment 214(A) may be configured to indicate whether a service chain BitVector is included and/or whether one or more trust levels are included. In some examples, the first bit may include a "1" indicating that a service chain BitVector is included in the following bits. Additionally, or alternatively, the first bit may include a "0" indicating that one or more trust levels are included in the following bits. Additionally, or alternatively, the first bit may be empty, indicating that a service chain BitVector, followed by one or more trust levels, are included in the following bits. In examples where a service chain BitVector is included in the following bits, the following bits in the first segment 214(A) may correspond to a particular service, where a "1" for a given bit may indicate that the corresponding service is to be applied (or performed) to the network traffic destined to and/or originating from a given spoke and a "0" for a given bit may indicate that the corresponding service is not to be applied to the network traffic destined to and/or originating from a given spoke. Additionally, or alternatively, in examples where one or more trust levels are included in the following bits, the following bits in the first segment 214(A) may include, for each bit, an indication of a trust level associated with a given spoke and/or multiple bits indicating a trust zone associated with a given spoke.

Figure 3:
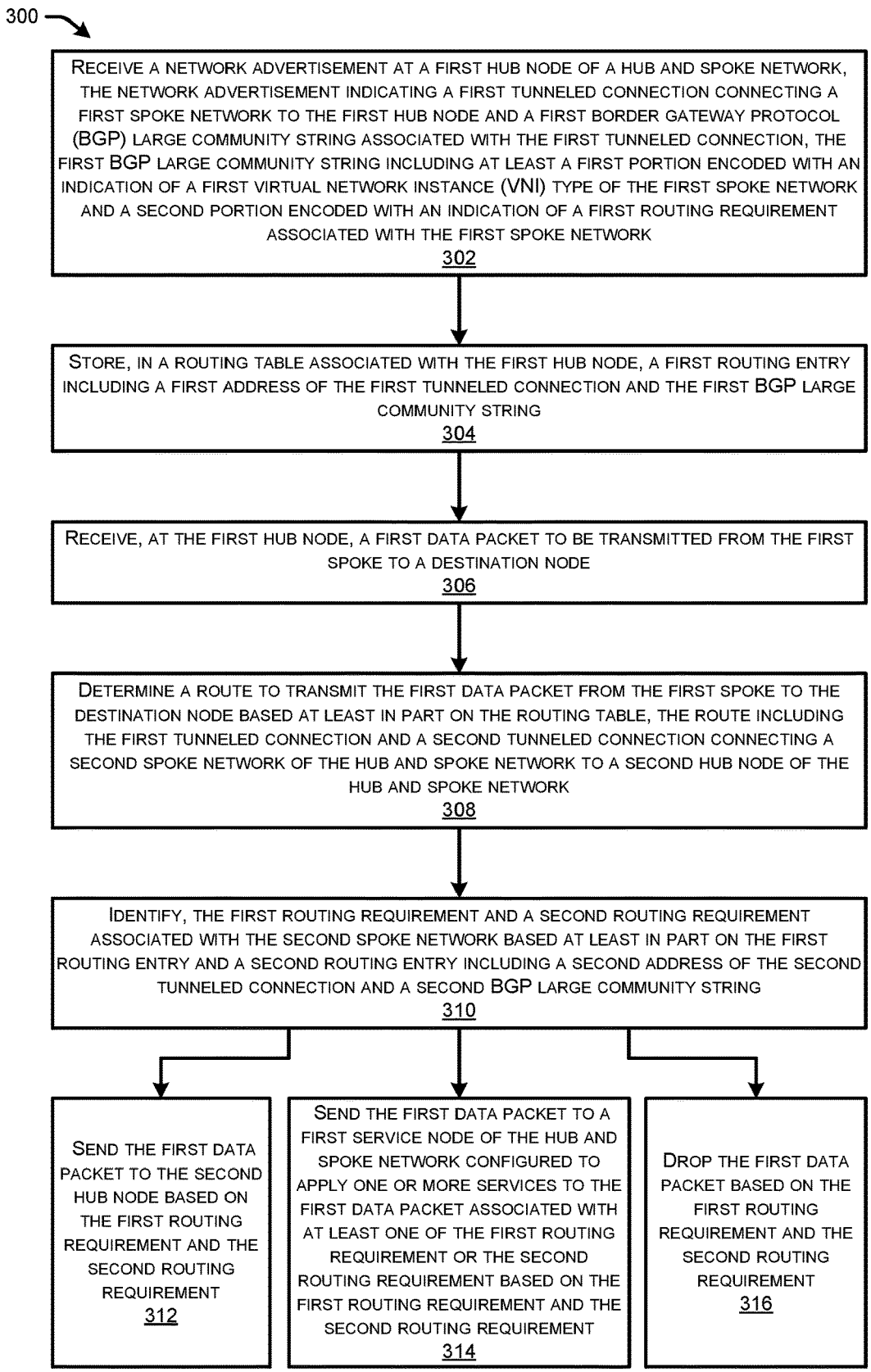
FIG. 3 illustrates a flow diagram of an example method for a first hub node of a hub and spoke overlay network to receive a packet, determine a transmission route from a source node to a destination node, identify routing requirements associated with the spoke networks included in the transmission route, and make a routing decision based on the routing requirements.
Figure 4:
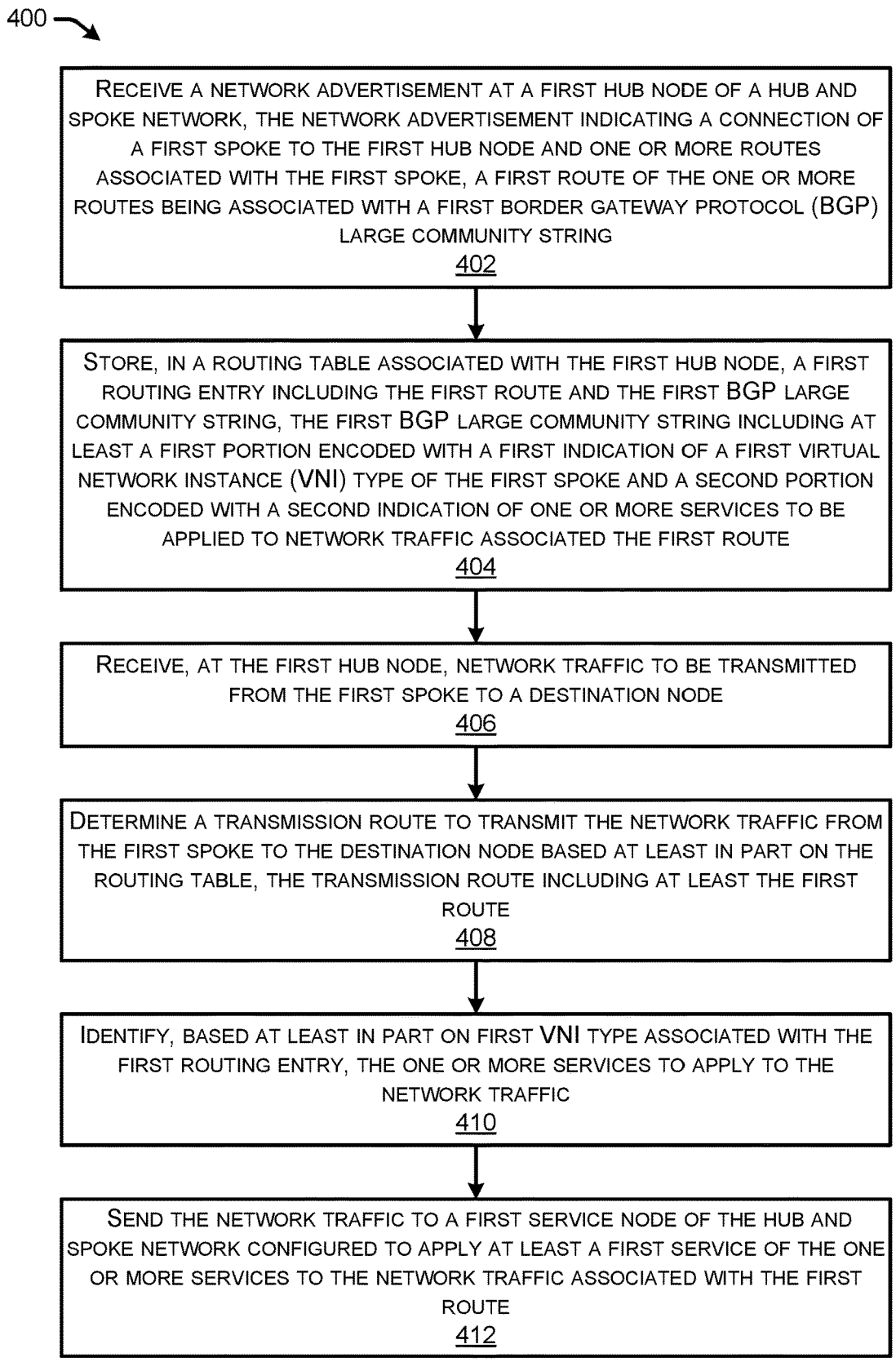
FIG. 4 illustrates a flow diagram of an example method for a first hub node of a hub and spoke overlay network to receive a packet, determine a transmission route from a source node to a destination node, identify one or more services to be applied to the network traffic, and send the packet to a service node configured to apply the one or more services.
Figure 5:
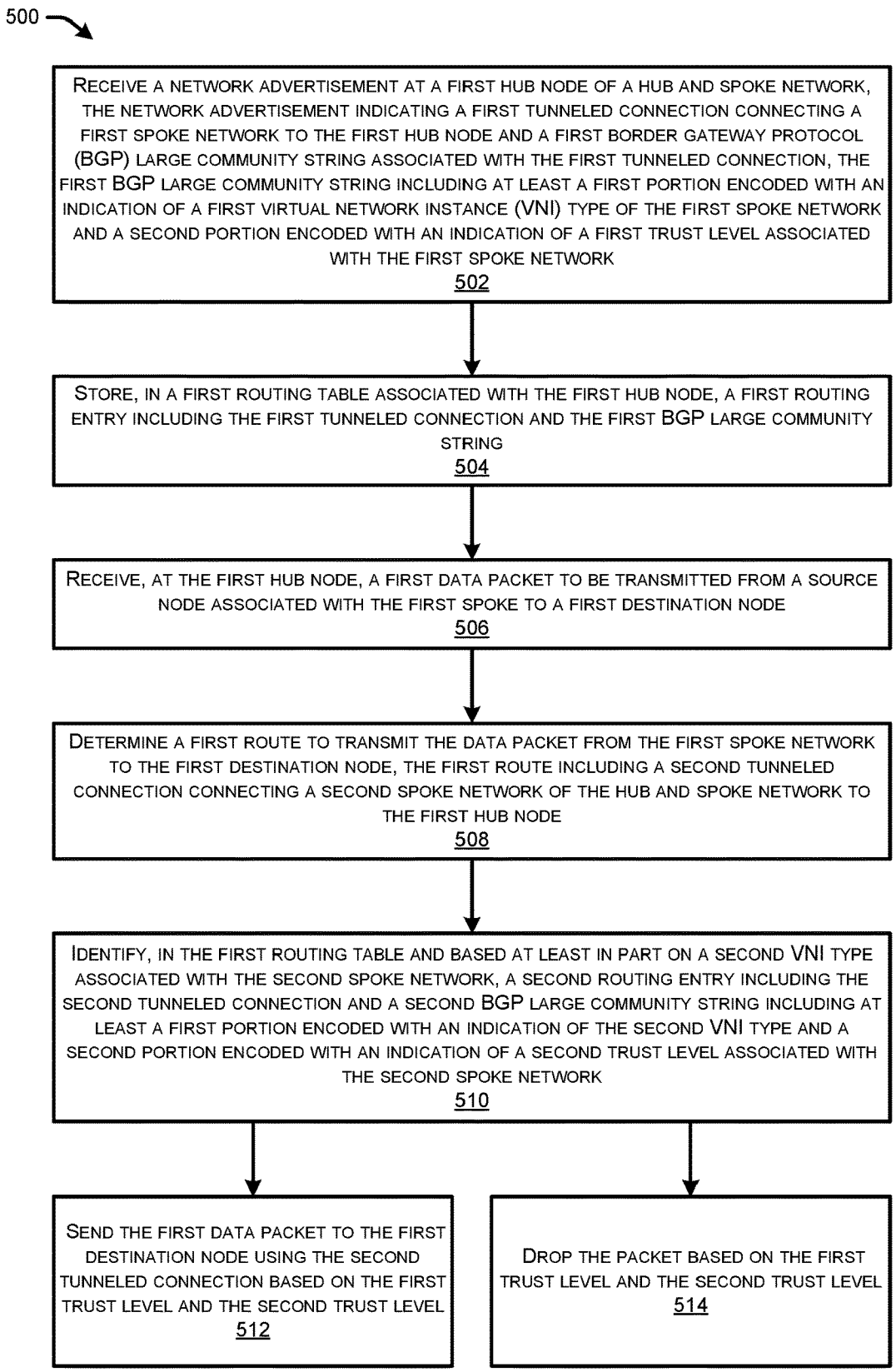
FIG. 5 illustrates a flow diagram of an example method for a first hub node of a hub and spoke overlay network to receive a packet from a source node to be transmitted to a destination node, determine a transmission route from the source node to the destination node, identify trust levels associated with tunneled connections of spoke networks associated with the transmission route, and make a routing decision based on the trust levels.

FIGS. 3-5 illustrate flow diagrams of example methods 300-500 and that illustrate aspects of the functions performed at least partly by the computing resource network 102, the hub node(s) 106, the spoke(s) 108, the site database(s) 110, the spoke network(s) 112, 114, 116 as described in FIGS. 1A-1C. The logical operations described herein with respect to FIGS. 3-5 may be implemented (1) as a sequence of computer-implemented acts or program modules running on a computing system and/or (2) as interconnected machine logic circuits or circuit modules within the computing system. In some examples, the method(s) 300-500 may be performed by a system comprising one or more processors and one or more non-transitory computer-readable media storing computer-executable instructions that, when executed by the one or more processors, cause the one or more processors to perform the method(s) 300-500.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3-5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for a first hub node provisioned in a site of a computing resource network (e.g., a hub and spoke overlay network) to receive a packet, determine a transmission route from a source node to a destination node, identify routing requirements associated with the spoke networks included in the transmission route, and make a routing decision based on the routing requirements. In some examples, the computing resource network, the site, the first hub node, the source node, the destination node, and/or the spoke network(s) may be configured as the computing resource network 102, site A 104(A), hub node A 106(A), tenant node(s) 118(1), tenant node(s) 118(2), and/or the spoke network(s) 112, 114, 116 as described with respect to FIGS. 1A-1C, respectively.

At 302, the method 300 includes receiving a network advertisement at a first hub node of a hub and spoke network. In some examples, the network advertisement may be configured as a data packet, an advertisement packet, and/or an application programming interface (API) call, such as, for example, a representational state transfer (REST) API call including details for configuring a given spoke network with the computing resource network. In some examples, the network advertisement may indicate a first tunneled connection connecting a first spoke network to the first hub node and/or a first border gateway protocol (BGP) large community string associated with the first tunneled connection. In some examples, the first BGP large community string may include at least a first portion encoded with an indication of a first virtual network instance (VNI) type of the first spoke network and/or a second portion encoded with an indication of a first routing requirement associated with the first spoke network. Additionally, or alternatively, the BGP large community string may be configured as the BGP large community string 200 as described with respect to FIG. 2A or 2B.

At 304, the method 300 includes storing a first routing entry including a first address of the first tunneled connection and the first BGP large community string. In some examples, the first routing entry may be stored in a routing table associated with the first hub node.

At 306, the method 300 includes receiving, at the first hub node, a first data packet to be transmitted from the first spoke to a destination node. In some examples, the first data packet may include an inner header including next hop information for a destination tenant node provisioned in a spoke network and/or an outer header including next hop information for a given spoke node of the hub and spoke overlay network.

At 308, the method 300 includes determining a route to transmit the first data packet from the first spoke to the destination node. In some examples, the route may be based at least in part on the routing table. Additionally, or alternatively, the route may include the first tunneled connection and/or a second tunneled connection connecting a second spoke network of the hub and spoke network to a second hub node of the hub and spoke network. In some examples, the first tunneled connection and/or the second tunneled connection may correspond to the first tunneled connection 120(1) and/or the second tunneled connection 120(2) as described with respect to FIG. 1A.

At 310, the method 300 includes identifying the first routing requirement and/or a second routing requirement associated with the second spoke network. In some examples, the first routing requirement and/or the second routing requirement may be based at least in part on the first routing entry and/or a second routing entry including a second address of the second tunneled connection and/or a second BGP large community string. In some examples, the second routing entry may be stored in the routing table. In some examples, the method 300 may proceed to step 312 based on the first routing requirement and/or the second routing requirement. Additionally, or alternatively, the method 300 may proceed to step 314 based on the first routing requirement and/or the second routing requirement. Additionally, or alternatively, the method 300 may proceed to step 316 based on the first routing requirement and/or the second routing requirement.

At 312, the method 300 includes sending the first data packet to the second hub node based at least in part on the first routing requirement and/or the second routing requirement. For example, it may be determined that the first routing requirement and the second routing requirement are compatible with one another (e.g., the routing requirements indicate trust levels and/or trust zones which are configured to allow network traffic between respective tunneled connections), such that they are configured to allow network traffic to be transmitted between respective network tunnels.

At 314, the method 300 includes sending the first data packet to a first service node of the hub and spoke network configured to apply one or more services to the first data packet associated with at least one of the first routing requirement or the second routing requirement based at least in part on the first routing requirement and the second routing requirement. For example, the first routing requirement and/or the second routing requirement may represent a service chain BitVector indicating one or more services to be applied to network traffic to and/or from respective tunneled connections, and the first hub node may send the network traffic to a service node configured to apply the one or more services to the network traffic.

At 316, the method 300 includes dropping the first data packet based at least in part on the first routing requirement and the second routing requirement. For example, it may be determined that the first routing requirement and the second routing requirement are not compatible with one another (e.g., the routing requirements indicate trust levels and/or trust zones which are configured to segregate network traffic between respective tunneled connections), such that they are configured to segregate network traffic to be transmitted between respective network tunnels.

In some examples, the first routing requirement includes a BitVector indicating the one or more services to be applied to network traffic associated with the first tunneled connection. Additionally, or alternatively, the method 300 includes sending the first data packet to the first service node based at least in part on the BitVector.

In some examples, the BitVector may indicate the first service to be applied to the network traffic associated with the first tunneled connection. Additionally, or alternatively, the BitVector may indicate a second service to be skipped by the network traffic associated with the first tunneled connection. Additionally, or alternatively, the BitVector may indicate an order of the one or more services to be applied to the network traffic associated with the first tunneled connection.

In some examples, the first routing requirement may indicate a first trust level associated with the first tunneled connection and/or the second routing requirement may indicate a second trust level associated with the second tunneled connection. Additionally, or alternatively, the method 300 includes sending the first data packet to the second hub node based at least in part on the first trust level and the second trust level. Additionally, or alternatively, the method 300 includes dropping the first data packet based at least in part on the first trust level and the second trust level.

Additionally, or alternatively, the method 300 includes determining that the second trust level is configured to allow network traffic associated with the first trust level. Additionally, or alternatively, the method 300 includes sending the first data packet, via the second hub node, to the destination node using the second tunneled connection based at least in part on determining that the second trust level is configured to allow the network traffic associated with the first trust level.

Additionally, or alternatively, the method 300 includes determining that the second trust level is configured to reject network traffic associated with the first trust level. Additionally, or alternatively, the method 300 includes dropping the first data packet based at least in part determining that the second trust level is configured to reject the network traffic associated with the first trust level.

FIG. 4 illustrates a flow diagram of an example method 400 for a first hub node of a hub and spoke overlay network to receive a packet, determine a transmission route from a source node to a destination node, identify one or more services to be applied to the network traffic, and send the packet to a service node configured to apply the one or more services.

At 402, the method 400 includes receiving a network advertisement at a first hub node of a hub and spoke network. In some examples, the network advertisement may be configured as an advertisement packet and/or an application programming interface (API) call, such as, for example, a representational state transfer (REST) API call including details for configuring a given spoke network with the computing resource network. In some examples, the network advertisement may indicate a connection of a first spoke to the first hub node and/or one or more routes associated with the first spoke. In some examples, a first route of the one or more routes may be associated with a first border gateway protocol (BGP) large community string. In some examples, the first BGP large community string may include at least a first portion encoded with an indication of a first virtual network instance (VNI) type of the first spoke and/or a second portion encoded with an indication of a first routing requirement associated with the first spoke network. Additionally, or alternatively, the BGP large community string may be configured as the BGP large community string 200 as described with respect to FIG. 2A.

At 404, the method 400 includes storing a first routing entry including the first route and the first BGP large community string. In some examples, the first routing entry may be stored in a routing table associated with the first hub node. In some examples, the first BGP large community string may include at least a first portion encoded with a first indication of a first virtual network instance (VNI) type of the first spoke and/or a second portion encoded with a second indication of one or more services to be applied to network traffic associated the first route.

At 406, the method 400 includes receiving, at the first hub node, network traffic to be transmitted from the first spoke to a destination node. In some examples, the network traffic may include an inner header including next hop information for a destination tenant node provisioned in a spoke network and/or an outer header including next hop information for a given spoke node of the hub and spoke overlay network.

At 408, the method 400 includes determining a transmission route to transmit the network traffic from the first spoke to the destination node. In some examples, the transmission route may be based at least in part on the routing table. Additionally, or alternatively, the transmission route including at least the first route.

At 410, the method 400 includes identifying the one or more services to apply to the network traffic. In some examples, the one or more services to apply to the network traffic may be based at least in part on first VNI type associated with the first routing entry.

At 412, the method 400 includes sending the network traffic to a first service node of the hub and spoke network configured to apply at least a first service of the one or more services to the network traffic associated with the first route.

In some examples, the network advertisement may comprise at least one of an advertisement packet or an application programming interface (API) call.

Additionally, or alternatively, the method 400 may include receiving the network traffic at the first hub node and from the service node after sending the network traffic to the service node. Additionally, or alternatively, the method 400 may include sending the network traffic to the destination node after sending the network traffic to the service node.

In some examples, the transmission route may include at least a second route associated with a second connection of a second spoke to a second hub node remote from the first hub node. In some examples, the second route may be associated with a second BGP large community string. Additionally, or alternatively, the method 400 includes sending the network traffic from first hub node to the second hub node. Additionally, or alternatively, the method 400 includes identifying, by the second hub node and based at least in part on a second VNI type associated with a second routing entry including the second route, a second service of the one or more services to apply to the network traffic. Additionally, or alternatively, the method 400 includes sending the network traffic to a second service node of the hub and spoke network configured to apply the second service associated with the second route.

In some examples, the second indication of the one or more services may comprise a BitVector indicating, for a service of the one or more services, whether to apply the service to the network traffic.

In some examples, the BitVector may indicate the first service to be performed by the first service node and/or a second service to be performed by a second service node. Additionally, or alternatively, the method 400 includes after sending the network traffic to the first service node and prior to sending the network traffic to the destination node, causing the network traffic to be sent to the second service node.

In some examples, the BitVector may indicate the first service to be applied to the network traffic. Additionally, or alternatively, the BitVector may indicate a second service to be skipped by the network traffic. Additionally, or alternatively, the BitVector may indicate an order of the one or more services to be applied to the network traffic.

FIG. 5 illustrates a flow diagram of an example method 500 for a first hub node of a hub and spoke overlay network to receive a packet, determine a transmission route from a source node to a destination node, identify trust levels associated with tunneled connections of spoke networks associated with the transmission route, and make a routing decision based on the trust levels.

At 502, the method 500 includes receiving a network advertisement at a first hub node of a hub and spoke network. In some examples, the network advertisement may be configured as an advertisement packet and/or an application programming interface (API) call, such as, for example, a representational state transfer (REST) API call including details for configuring a given spoke network with the computing resource network. In some examples, the network advertisement may indicate a first tunneled connection connecting a first spoke network to the first hub node and/or a first border gateway protocol (BGP) large community string associated with the first tunneled connection. In some examples, the first BGP large community string may include at least a first portion encoded with an indication of a first virtual network instance (VNI) type of the first spoke network and/or a second portion encoded with an indication of a first trust level associated with the first spoke network.

At 504, the method 500 includes storing a first routing entry including the first tunneled connection and the first BGP large community string. In some examples, the first routing entry may be stored in a first routing table associated with the first hub node.

At 506, the method 500 includes receiving, at the first hub node, a first data packet to be transmitted from a source node associated with the first spoke to a first destination node. In some examples, the first data packet may include an inner header including next hop information for a destination tenant node provisioned in a spoke network and/or an outer header including next hop information for a given spoke node of the hub and spoke overlay network.

At 508, the method 500 includes determining a first route to transmit the data packet from the first spoke network to the first destination node. In some examples, the first route may include a second tunneled connection connecting a second spoke network of the hub and spoke network to the first hub node. In some examples, the first tunneled connection and/or the second tunneled connection may correspond to the first tunneled connection 120(1) and/or the second tunneled connection 120(2) as described with respect to FIG. 1A.

At 510, the method 500 includes identifying a second routing entry including the second tunneled connection and/or a second BGP large community string including at least a first portion encoded with an indication of the second VNI type and/or a second portion encoded with an indication of a second trust level associated with the second spoke network. In some examples, the second routing entry may be stored in the first routing table. Additionally, or alternatively, identifying the second routing entry may be based at least in part on a second VNI type associated with the second spoke network. In some examples, the method 500 may proceed to step 512 based on the first trust level and/or the second trust level. Additionally, or alternatively, the method 500 may proceed to step 514 based on the first trust level and/or the second trust level.

At 512, the method 500 includes sending the first data packet to the first destination node using the second tunneled connection based at least in part on the first trust level and the second trust level. For example, it may be determined that the first trust level and the second trust level are compatible with one another (e.g., the trust levels are configured to allow network traffic between respective tunneled connections), such that they are configured to allow network traffic to be transmitted between respective network tunnels.

At 514, the method 500 includes dropping the first data packet based at least in part on the first trust level and the second trust level. For example, it may be determined that the first trust level and the second trust level are not compatible with one another (e.g., the levels are configured to segregate network traffic between respective tunneled connections), such that they are configured to segregate network traffic to be transmitted between respective network tunnels.

Additionally, or alternatively, the method 500 includes determining that the second trust level is configured to allow network traffic associated with the first trust level. Additionally, or alternatively, the method 500 includes sending the first data packet to the destination node using the second tunneled connection based at least in part on determining that the second trust level is configured to allow the network traffic associated with the first trust level.

Additionally, or alternatively, the method 500 includes determining that the second trust level is configured to reject network traffic associated with the first trust level. Additionally, or alternatively, the method 500 includes dropping the first data packet based at least in part determining that the second trust level is configured to reject the network traffic associated with the first trust level.

Additionally, or alternatively, the method 500 includes sending, from the first hub node and to a second hub node of the hub and spoke network that is remote from the first hub node, the network advertisement. Additionally, or alternatively, the method 500 includes receiving, at the first hub node, a second data packet to be transmitted from the source node associated with the first spoke network to a second destination node. Additionally, or alternatively, the method 500 includes determining a second route to transmit the data packet from the first spoke network to the second destination node. In some examples, the second route including a third tunneled connection connecting a third spoke network of the hub and spoke network to the second hub node. Additionally, or alternatively, the method 500 includes sending the second data packet from the first hub node to the second hub node. Additionally, or alternatively, the method 500 includes identifying, in a second routing table associated with the second hub node and based at least in part on a third VNI type associated with the third spoke network, a third routing entry including the third tunneled connection and a third BGP large community string including at least a first portion encoded with an indication of the third VNI type and/or a second portion encoded with an indication of a third trust level associated with the third spoke network. Additionally, or alternatively, the method 500 includes sending the second data packet from the second hub node to the second destination node using the third tunneled connection based at least in part on the first trust level and/or the third trust level. Additionally, or alternatively, the method 500 includes dropping the second data packet based at least in part on the first trust level and the third trust level.

In some examples, the first trust level may be configured to allow network traffic associated with the second trust level and/or one or more third trust levels that are different from the first trust level. Additionally, or alternatively, the second trust level may be configured to allow network traffic associated with the second trust level and/or reject network traffic associated with the first trust level and/or the one or more third trust levels.

In some examples, the first spoke network may be configured as a private network, a public network, and/or an unsecured internet access point.

Figure 6:
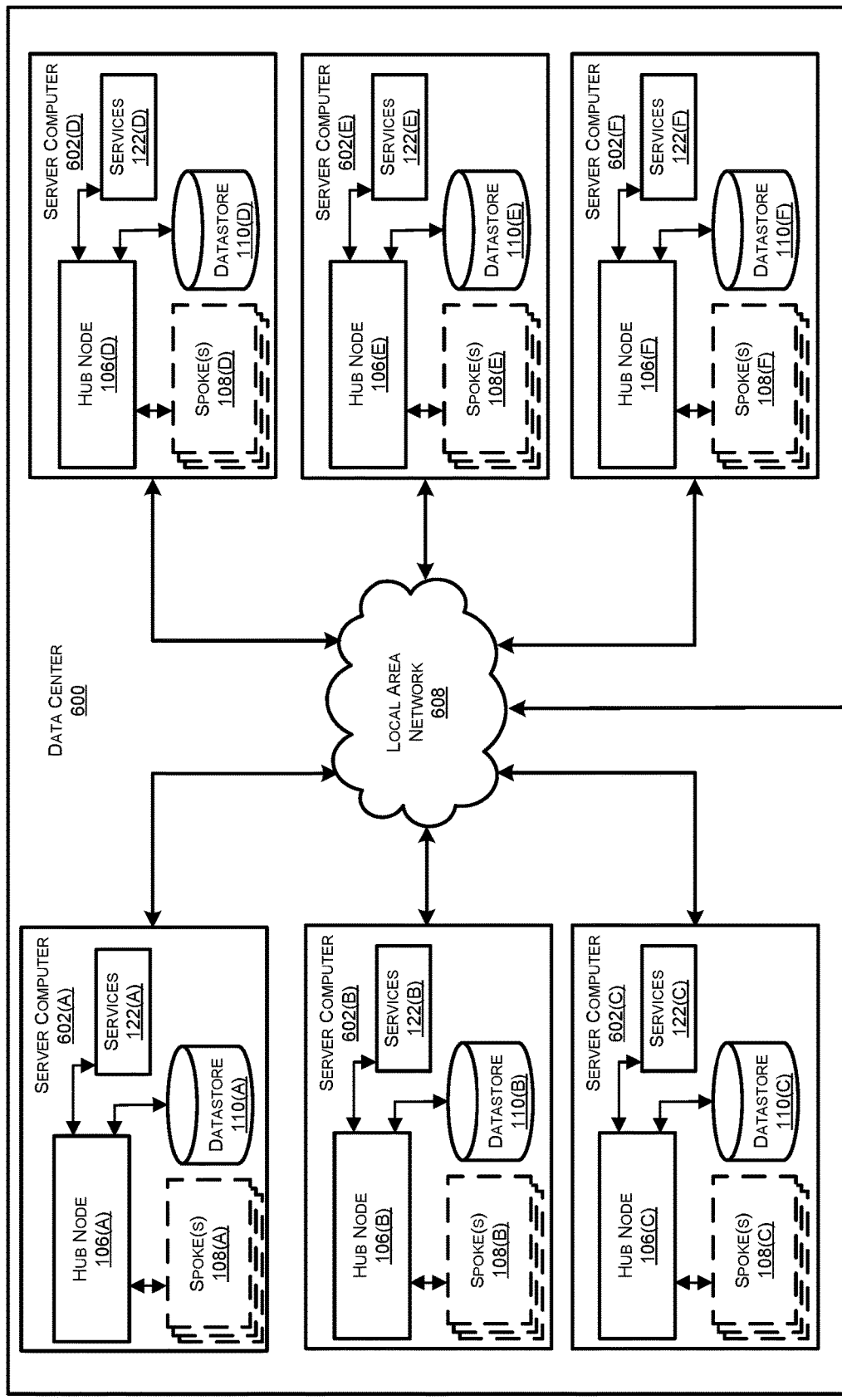
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers associated with the site (or data center) 104 described herein with respect to FIGS. 1A-1C.

The server computers 602 can be standard tower, rack-mount, or blade server computers configured appropriately for providing the computing resources described herein. As mentioned above, the computing resources provided by the computing resource network 102 can be data processing resources such as VM instances or hardware computing systems, database clusters, computing clusters, storage clusters, data storage resources, database resources, networking resources, and others. Some of the servers 602 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute a hub node 106 one or more spoke(s) 108, one or more datastore(s) 110, and/or one or more services 122.

In some instances, the computing resource network 102 may provide computing resources, like application containers, VM instances, and storage, on a permanent or an as-needed basis. Among other types of functionality, the computing resources provided by the computing resource network 102 may be utilized to implement the various services described above. The computing resources provided by the computing resource network 102 can include various types of computing resources, such as data processing resources like application containers and VM instances, data storage resources, networking resources, data communication resources, network services, and the like.

Each type of computing resource provided by the computing resource network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing resources network 102 can also be configured to provide other types of computing resources not mentioned specifically herein.

The computing resources provided by the computing resource network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
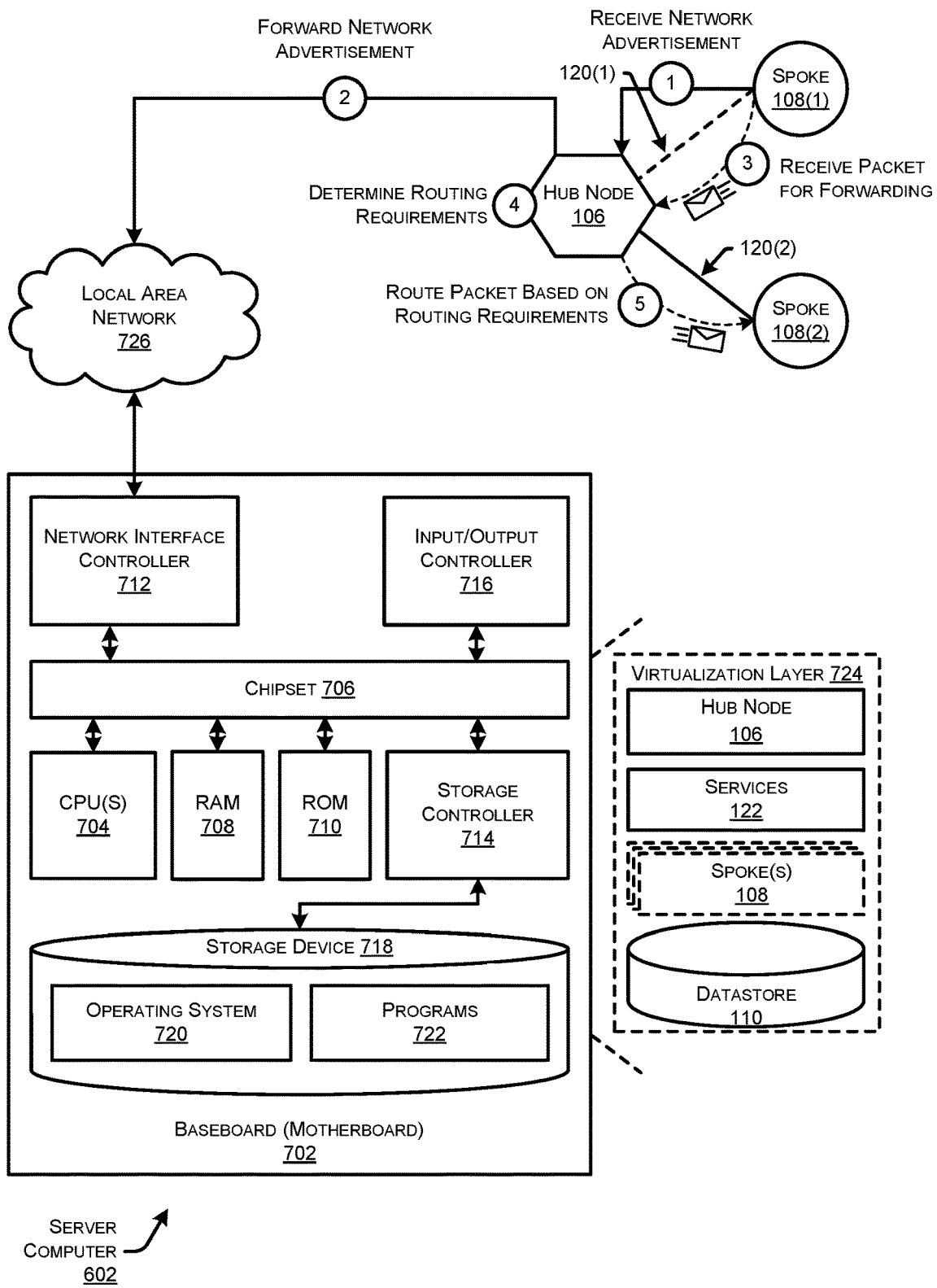
FIG. 7 is a computer architecture diagram showing an illustrative computer hardware architecture for implementing a server device that can be utilized to implement aspects of the various technologies presented herein.

FIG. 7 shows an example computer architecture for a computing device (or network routing device) 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computing device 602 may, in some examples, correspond to a physical server of a data center described herein with respect to FIGS. 1A-1C.

The computing device 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computing device 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computing device 602. The chipset 706 can further provide an interface to a computer-readable storage medium such as a read-only memory ("ROM") 710 or non-volatile RAM ("NVRAM") for storing basic routines that help to startup the computing device 602 and to transfer information between the various components and devices. The ROM 710 or NVRAM can also store other software components necessary for the operation of the computing device 602 in accordance with the configurations described herein.

The computing device 602 can operate in a networked environment using logical connections to remote computing devices and computer systems through a network, such as the network 726. The chipset 706 can include functionality for providing network connectivity through a NIC 712, such as a gigabit Ethernet adapter. The NIC 712 is capable of connecting the computing device 602 to other computing devices over the network 726. It should be appreciated that multiple NICs 712 can be present in the computing device 602, connecting the computer to other types of networks and remote computer systems.

The computing device 602 can be connected to a storage device 618 that provides non-volatile storage for the computing device 602. The storage device 618 can store an operating system 720, programs 722, and data, which have been described in greater detail herein. The storage device 618 can be connected to the computing device 602 through a storage controller 714 connected to the chipset 706. The storage device 618 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 602 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 602 can store information to the storage device 618 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 602 can further read information from the storage device 618 by detecting the physical states or characteristics of one or more particular locations within the physical storage units.

In addition to the mass storage device 618 described above, the computing device 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 602. In some examples, the operations performed by the computing resource network 102, and or any components included therein, may be supported by one or more devices similar to computing device 602. Stated otherwise, some or all of the operations performed by the computing resource network 102, and or any components included therein, may be performed by one or more computing device 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 720 utilized to control the operation of the computing device 602. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 602.

In one embodiment, the storage device 618 or other computer-readable storage media is encoded with computer-executable instructions which, when loaded into the computing device 602, transform the computer from a general-purpose computing system into a special-purpose computer capable of implementing the embodiments described herein. These computer-executable instructions transform the computing device 602 by specifying how the CPUs 704 transition between states, as described above. According to one embodiment, the computing device 602 has access to computer-readable storage media storing computer-executable instructions which, when executed by the computing device 602, perform the various processes described above with regard to FIGS. 1A-C, and/or 3-5 The computing device 602 can also include computer-readable storage media having instructions stored thereupon for performing any of the other computer-implemented operations described herein.

The computing device 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computing device 602 might not include all of the components shown in FIG. 7, can include other components that are not explicitly shown in FIG. 7, or might utilize an architecture completely different than that shown in FIG. 7.

The server computer 602 may support a virtualization layer 724, such as one or more components associated with the computing resource network 102, such as, for example, the hub node 106, the service(s) 122, the spoke(s) 108, and/or the data store 110. At "1," a hub node 106 may receive a network advertisement comprising a BGP large community string from a first spoke 108(1). The hub node 106 may decode network routing information from various portions of the BGP large community string and/or store the network routing information. At "2," the first hub node may store the network routing information and/or forward the packet, including the BGP large community string, to one or more additional hub node(s) 106 that are remote from the first hub node 106 (e.g., provisioned in a network site separate from the first hub node 106). At "3," the hub node 106 may receive a data packet from the first spoke 108(1) to be forwarded to the second spoke 108(2). At "4," the hub node 106 may determine a transmission route to route the packet to the second spoke 108(2) and/or routing requirements associated with the transmission route. In some examples, the routing requirements may comprise a trust level, a trust zone, and/or a service chain BitVector. At "5," the hub node 106 may route the packet to the second spoke 108(2) based on the routing requirements. For example, the hub node 106 may send the packet to a service node configured to apply one or more service(s) 122 to the packet as indicated by the BitVector. Additionally, or alternatively, the hub node 106 may drop the packet or send the packet to the second spoke 108(2) based on the trust level(s) and/or trust zone(s) associated with the spokes 108.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving a network advertisement at a first hub node of a hub and spoke network, the network advertisement indicating a first tunneled connection connecting a first spoke network to the first hub node and a first border gateway protocol (BGP) large community string associated with the first tunneled connection;
    decoding, from a first portion of the first BGP large community string, a first indication of a first virtual network instance (VNI) type of the first spoke network;
    decoding, from a second portion of the first BGP large community string, a second indication of a first routing requirement associated with the first spoke network, the first routing requirement indicating a routing action to perform on network traffic associated with the first spoke network;
    storing, in a routing table associated with the first hub node, a first routing entry including a first address of the first tunneled connection, the first indication of the first VNI type, and the second indication of the first routing requirement;
    receiving, at the first hub node, a first data packet to be transmitted from the first spoke to a destination node;
    determining a route to transmit the first data packet from the first spoke to the destination node based at least in part on the routing table, the route including the first tunneled connection and a second tunneled connection connecting a second spoke network of the hub and spoke network to a second hub node of the hub and spoke network;
    identifying the first routing requirement and a second routing requirement associated with the second spoke network based at least in part on the first routing entry and a second routing entry including a second address of the second tunneled connection and a second BGP large community string; and
    based at least in part on the first routing requirement and the second routing requirement, one of:
        sending the first data packet to the second hub node;
        sending the first data packet to a first service node of the hub and spoke network configured to apply one or more services to the first data packet associated with at least one of the first routing requirement or the second routing requirement; or
        dropping the first data packet.

2. The method of claim 1, wherein the first routing requirement includes a BitVector indicating the one or more services to be applied to network traffic associated with the first tunneled connection, and the method further comprising sending the first data packet to the first service node based at least in part on the BitVector.

3. The method of claim 2, wherein the BitVector indicates at least one of:
    the first service to be applied to the network traffic associated with the first tunneled connection;
    a second service to be skipped by the network traffic associated with the first tunneled connection; or
    an order of the one or more services to be applied to the network traffic associated with the first tunneled connection.

4. The method of claim 1, wherein the first routing requirement indicates a first trust level associated with the first tunneled connection and the second routing requirement indicates a second trust level associated with the second tunneled connection, and the method further comprising based at least in part on the first trust level and the second trust level, one of:
    sending the first data packet to the second hub node; or
    dropping the first data packet.

5. The method of claim 4, further comprising:
determining that the second trust level is configured to allow network traffic associated with the first trust level; and
sending the first data packet, via the second hub node, to the destination node using the second tunneled connection based at least in part on determining that the second trust level is configured to allow the network traffic associated with the first trust level.

6. The method of claim 4, further comprising:
determining that the second trust level is configured to reject network traffic associated with the first trust level; and
dropping the first data packet based at least in part determining that the second trust level is configured to reject the network traffic associated with the first trust level.

7. The method of claim 1, wherein the network advertisement comprises at least one of an advertisement packet or an application programming interface (API) call.

8. A system comprising:
one or more processors; and
one or more computer-readable media storing computer-executable instructions that, when executed by the one or more processors, cause the one or more processors to perform operations comprising:
receiving a network advertisement at a first hub node of a hub and spoke network, the network advertisement indicating a connection of a first spoke to the first hub node and one or more routes associated with the first spoke, a first route of the one or more routes being associated with a first border gateway protocol (BGP) large community string included in the network advertisement;
decoding, from a first portion of the first BGP large community string, a first indication of a first virtual network instance (VNI) type of the first spoke;
decoding, from a second portion of the first BGP large community string, a second indication of one or more services to be applied to network traffic associated with the first route;
storing, in a routing table associated with the first hub node, a first routing entry including the first route, the first indication of the first VNI type of the first spoke, and the second indication of the one or more services;
receiving, at the first hub node, network traffic to be transmitted from the first spoke to a destination node;
determining a transmission route to transmit the network traffic from the first spoke to the destination node based at least in part on the routing table, the transmission route including at least the first route;
identifying, based at least in part on first VNI type associated with the first routing entry, the one or more services to apply to the network traffic; and
sending the network traffic to a first service node of the hub and spoke network configured to apply at least a first service of the one or more services to the network traffic associated with the first route.

9. The system of claim 8, wherein the network advertisement comprises at least one of an advertisement packet or an application programming interface (API) call.

10. The system of claim 8, the operations further comprising, after sending the network traffic to the service node:
receiving the network traffic at the first hub node and from the service node; and
sending the network traffic to the destination node.

11. The system of claim 8, wherein the transmission route includes at least a second route associated with a second connection of a second spoke to a second hub node remote from the first hub node, the second route being associated with a second BGP large community string, and the operations further comprising:
sending the network traffic from first hub node to the second hub node;
identifying, by the second hub node and based at least in part on a second VNI type associated with a second routing entry including the second route, a second service of the one or more services to apply to the network traffic; and
sending the network traffic to a second service node of the hub and spoke network configured to apply the second service associated with the second route.

12. The system of claim 8, wherein the second indication of the one or more services comprises a Bit Vector indicating, for a service of the one or more services, whether to apply the service to the network traffic.

13. The system of claim 12, wherein the BitVector indicates the first service to be performed by the first service node and a second service to be performed by a second service node, and the operations further comprising after sending the network traffic to the first service node and prior to sending the network traffic to the destination node, causing the network traffic to be sent to the second service node.

14. The system of claim 12, wherein the BitVector indicates at least one of:
the first service to be applied to the network traffic;
a second service to be skipped by the network traffic; or
an order of the one or more services to be applied to the network traffic.

15. A method comprising:
receiving a network advertisement at a first hub node of a hub and spoke network, the network advertisement indicating a first tunneled connection connecting a first spoke network to the first hub node and a first border gateway protocol (BGP) large community string associated with the first tunneled connection;
decoding, from a first portion of the first BGP large community string, a first indication of a first virtual network instance (VNI) type of the first spoke network;
decoding, from a second portion of the first BGP large community, a second indication of a first trust level associated with the first spoke network;
storing, in a first routing table associated with the first hub node, a first routing entry including the first tunneled connection, the first indication of the first VNI type of the first spoke network, and the second indication of the first trust level associated with the first spoke network;
receiving, at the first hub node, a first data packet to be transmitted from a source node associated with the first spoke to a first destination node;
determining a first route to transmit the data packet from the first spoke network to the first destination node, the first route including a second tunneled connection connecting a second spoke network of the hub and spoke network to the first hub node;
identifying, in the first routing table and based at least in part on a second VNI type associated with the second spoke network, a second routing entry including the second tunneled connection and a second BGP large community string including at least a first portion encoded with an indication of the second VNI type and a second portion encoded with an indication of a second trust level associated with the second spoke network; and based at least in part on the first trust level and the second trust level, one of:
sending the first data packet to the first destination node using the second tunneled connection; or
dropping the first data packet.

16. The method of claim 15, further comprising:
determining that the second trust level is configured to allow network traffic associated with the first trust level; and
sending the first data packet to the destination node using the second tunneled connection based at least in part on determining that the second trust level is configured to allow the network traffic associated with the first trust level.

17. The method of claim 15, further comprising:
determining that the second trust level is configured to reject network traffic associated with the first trust level; and
dropping the first data packet based at least in part determining that the second trust level is configured to reject the network traffic associated with the first trust level.

18. The method of claim 15, further comprising:
sending, from the first hub node and to a second hub node of the hub and spoke network that is remote from the first hub node, the network advertisement;
receiving, at the first hub node, a second data packet to be transmitted from the source node associated with the first spoke network to a second destination node;
determining a second route to transmit the data packet from the first spoke network to the second destination node, the second route including a third tunneled connection connecting a third spoke network of the hub and spoke network to the second hub node;
sending the second data packet from the first hub node to the second hub node;
identifying, in a second routing table associated with the second hub node and based at least in part on a third VNI type associated with the third spoke network, a third routing entry including the third tunneled connection and a third BGP large community string including at least a first portion encoded with an indication of the third VNI type and a second portion encoded with an indication of a third trust level associated with the third spoke network; and
based at least in part on the first trust level and the third trust level, one of:
sending the second data packet from the second hub node to the second destination node using the third tunneled connection; or
dropping the second data packet.

19. The method of claim 15, wherein:
the first trust level is configured to allow network traffic associated with the second trust level and one or more third trust levels that are different from the first trust level; and
the second trust level is configured to allow network traffic associated with the second trust level and reject network traffic associated with the first trust level and the one or more third trust levels.

20. The method of claim 15, wherein the first spoke network is configured as one of:
a private network;
a public network; or
an unsecured internet access point.

* * * * *